(12) United States Patent
Newman et al.

(10) Patent No.: US 9,961,355 B2
(45) Date of Patent: *May 1, 2018

(54) ENCODING AND DECODING SELECTIVELY RETRIEVABLE REPRESENTATIONS OF VIDEO CONTENT

(71) Applicant: GoPro, Inc., Carlsbad, CA (US)

(72) Inventors: David A. Newman, San Diego, CA (US); Brian G. Schunck, San Diego, CA (US)

(73) Assignee: GOPRO, INC., San Mateo, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/288,836

(22) Filed: Oct. 7, 2016

(65) Prior Publication Data

US 2017/0026658 A1  Jan. 26, 2017

Related U.S. Application Data

(63) Continuation of application No. 14/340,873, filed on Jul. 25, 2014, which is a continuation of application
(Continued)

(51) Int. Cl.
*H04N 19/44* (2014.01)
*H04N 19/63* (2014.01)
(Continued)

(52) U.S. Cl.
CPC ....... *H04N 19/44* (2014.11); *G11B 20/00007* (2013.01); *G11B 27/031* (2013.01);
(Continued)

(58) Field of Classification Search
CPC .... G11B 2020/00072; G11B 20/00007; G11B 27/031; H04N 19/423; H04N 19/44; H04N 19/63
See application file for complete search history.

(56) References Cited

U.S. PATENT DOCUMENTS 5,412,741 A   5/1995   Shapiro
5,448,315 A   9/1995   Soohoo
(Continued)

FOREIGN PATENT DOCUMENTS

EP   0561593 A2   9/1993
WO   WO-9424815 A1   10/1994
WO   WO-9952277 A1   10/1999

OTHER PUBLICATIONS

Achanta R., et al., "Slic Superpixels Compared to State-of-The-Art Superpixel Methods," IEEE Transactions on Pattern Analysis and Machine Intelligence, 2012, vol. 34 (11), pp. 2274-2282.
(Continued)

*Primary Examiner* — Anner N Holder
(74) *Attorney, Agent, or Firm* — Gazdzinksi & Associates, PC

(57) ABSTRACT

A system and method disposed to enable encoding, decoding and manipulation of digital video with substantially less processing load than would otherwise required. In particular, one disclosed method is directed to generating a compressed video data structure that is selectively decodable to a plurality of resolutions including the full resolution of the uncompressed stream. The desired number of data components and the content of the data components that make up the compressed video data, which determine the available video resolutions, are variable based upon the processing carried out and the resources available to decode and process the data components. During decoding, efficiency is substantially improved because only the data components necessary to generate a desired resolution are decoded. In variations, both temporal and spatial decoding are utilized to reduce frame rates, and hence, further reduce processor load. The system and method are particularly useful for real-time video editing applications.

29 Claims, 18 Drawing Sheets

Related U.S. Application Data

No. 13/113,950, filed on May 23, 2011, now Pat. No. 9,171,577, which is a continuation of application No. 10/779,335, filed on Feb. 12, 2004, now abandoned.

(60) Provisional application No. 60/465,595, filed on Apr. 25, 2003.

(51) Int. Cl.
  *H04N 19/423* (2014.01)
  *G11B 27/031* (2006.01)
  *G11B 20/00* (2006.01)

(52) U.S. Cl.
  CPC ........... *H04N 19/423* (2014.11); *H04N 19/63* (2014.11); *G11B 2020/00072* (2013.01)

(56) References Cited

U.S. PATENT DOCUMENTS

| | | | |
|---|---|---|---|
| 5,491,561 | A | 2/1996 | Fukuda |
| 5,506,619 | A | 4/1996 | Adams, Jr. et al. |
| 5,600,373 | A | 2/1997 | Chui et al. |
| 5,600,646 | A | 2/1997 | Polomski |
| 5,654,737 | A | 8/1997 | Der et al. |
| 5,691,768 | A | 11/1997 | Civanlar et al. |
| 5,729,691 | A | 3/1998 | Agarwal |
| 5,754,700 | A | 5/1998 | Kuzma |
| 5,788,352 | A | 8/1998 | Montroy et al. |
| 5,801,685 | A | 9/1998 | Miller et al. |
| 5,912,709 | A | 6/1999 | Takahashi |
| 5,983,263 | A | 11/1999 | Rothrock et al. |
| 6,028,807 | A | 2/2000 | Awsienko |
| 6,091,777 | A | 7/2000 | Guetz et al. |
| 6,091,778 | A | 7/2000 | Sporer et al. |
| 6,091,862 | A | 7/2000 | Okisu |
| 6,104,441 | A | 8/2000 | Wee et al. |
| 6,144,773 | A | 11/2000 | Kolarov et al. |
| 6,148,111 | A | 11/2000 | Creusere |
| 6,154,493 | A | 11/2000 | Acharya et al. |
| 6,154,600 | A | 11/2000 | Newman et al. |
| 6,154,771 | A | 11/2000 | Rangan et al. |
| 6,181,335 | B1 | 1/2001 | Hendricks et al. |
| 6,198,477 | B1 | 3/2001 | Kurtze et al. |
| 6,208,759 | B1 | 3/2001 | Wells |
| 6,226,038 | B1 | 5/2001 | Frink et al. |
| 6,229,929 | B1 | 5/2001 | Lynch et al. |
| 6,236,805 | B1 | 5/2001 | Sebestyen |
| 6,246,438 | B1 | 6/2001 | Nishikawa et al. |
| 6,301,428 | B1 | 10/2001 | Linzer |
| 6,337,881 | B1 | 1/2002 | Chaddha |
| 6,357,047 | B1 | 3/2002 | Kurtze et al. |
| 6,381,280 | B1 | 4/2002 | Lynch et al. |
| 6,414,686 | B1 | 7/2002 | Protheroe et al. |
| 6,501,797 | B1 | 12/2002 | Van Der Schaar et al. |
| 6,516,137 | B1 | 2/2003 | Posch et al. |
| 6,539,122 | B1 | 3/2003 | Abousleman |
| 6,570,924 | B1 | 5/2003 | Lynch et al. |
| 6,597,739 | B1 | 7/2003 | Li et al. |
| 6,654,850 | B2 | 11/2003 | Fox et al. |
| 6,658,057 | B1 | 12/2003 | Chen et al. |
| 6,700,587 | B1 | 3/2004 | Hasegawa et al. |
| 6,788,823 | B2 | 9/2004 | Allred et al. |
| 6,819,801 | B2 | 11/2004 | Kakarala et al. |
| 6,882,793 | B1 | 4/2005 | Fu et al. |
| 6,912,327 | B1 | 6/2005 | Hori et al. |
| 6,948,128 | B2 | 9/2005 | Ibrahim et al. |
| 6,954,498 | B1 | 10/2005 | Lipton |
| 7,206,804 | B1 | 4/2007 | Deshpande et al. |
| 7,372,999 | B2 | 5/2008 | Oneda et al. |
| 8,014,597 | B1 | 9/2011 | Newman |
| 8,358,701 | B2 | 1/2013 | Chou et al. |
| 8,606,073 | B2 | 12/2013 | Woodman |
| 8,658,057 | B2 | 2/2014 | Nakayama et al. |
| 9,171,577 | B1 | 10/2015 | Newman et al. |
| 2002/0018072 | A1 | 2/2002 | Chui |
| 2003/0007567 | A1 | 1/2003 | Newman et al. |
| 2003/0193602 | A1 | 10/2003 | Satoh et al. |
| 2003/0217296 | A1 | 11/2003 | Ma |
| 2004/0008779 | A1 | 1/2004 | Lai et al. |
| 2004/0032516 | A1 | 2/2004 | Kakarala |
| 2004/0213542 | A1 | 10/2004 | Hamasaka et al. |
| 2005/0175251 | A1 | 8/2005 | Taketa et al. |
| 2016/0239340 | A1 | 8/2016 | Chauvet et al. |
| 2016/0274338 | A1 | 9/2016 | Davies et al. |

OTHER PUBLICATIONS

Allène C., et al., "Seamless Image-based Texture Atlases Using Multi-band Blending," Pattern Recognition, 2008. ICPR 2008. 19th International Conference on, 2008.

Andreopoulos Y., et al., "Wavelet-Based Fully-Scalable Video Coding with In-Band Prediction," Proc. 3rd IEEE Benelux Signal Processing Symposium (SPS-2003), Leuven, Belgium, Mar. 21, 2002, pp. S02-1-S01-4.

Badrinarayanan V., et al., "Segnet: a Deep Convolutional Encoder-Decoder Architecture for Image Segmentation," arXiv preprint arXiv:1511.00561, 2015.

Barghout L. and Sheynin J., "Real-world scene perception and perceptual organization: Lessons from Computer Vision". Journal of Vision, 2013, vol. 13 (9). (Abstract).

Barghout L., "Visual Taxometric approach Image Segmentation using Fuzzy-Spatial Taxon Cut Yields Contextually Relevant Regions," Communications in Computer and Information Science (CCIS), Springer-Verlag, 2014, pp. 163-173.

Bay H., et al., "Surf: Speeded up Robust Features," European Conference on Computer Vision, Springer Berlin Heidelberg, 2006, pp. 404-417.

Beier et al., "Feature-Based Image Metamorphosis," in Computer Graphics Journal, Jul. 1992, vol. 26 (2), pp. 35-42.

Brainard R.C., et al., "Low-Resolution TV: Subjective Effects of Frame Repetition and Picture Replenishment," Bell Labs Technical Journal, Jan. 1967, vol. 46 (1), pp. 261-271.

Burt et al., "A Multiresolution Spline with Application to Image Mosaics," in ACM Transactions on Graphics (TOG), 1983, vol. 2, No. 4, pp. 217-236.

Chan T.F. and Vese LA., "Active contours without edges". IEEE Transactions on Image Processing, 2001, 10 (2), pp. 266-277 (hereinafter "Chan").

Chang H., et al., "Super-resolution Through Neighbor Embedding," Computer Vision and Pattern Recognition, 2004. CVPR 2004. Proceedings of the 2004 IEEE Computer Society Conference on, vol. 1, 2004.

Chao H., et al., An Approach to Integer Wavelet Transformations for Lossless Image Compression, SBIR Contract N00039-94-C-0013, 1997, 20 pages.

Co-pending U.S. Appl. No. 15/001,038, filed Jan. 19, 2016.

Elen R. "Whatever happened to Ambisonics" AudioMedia Magazine, Nov. 1991.

Girod B., et al., "Scalable Video Coding with Multiscale Motion Compensation and Unequal Error Protection," In Proc. International Symposium on Multimedia Communications and Video Coding, New York, Oct. 1995, pp. 475-482.

Girod B., et al., "Scalable Video Coding with Multiscale Motion Compensation and Unequal Error Protection," In Proc. International Symposium on Multimedia Communications and Video Coding, New York, Oct. 1995, pp. 1-8.

Girod, B. et al., "Multiresolution Coding of Image and Video Signals", Invited paper, Telecommunications Institute I, University of Erlangen-Nuremberg, D-91058 Erlangen, Germany, Sep. 1998, Rhodes, Greece, 4 pages.

Gormish M.J., et al., "Lossless and Nearly Lossless Compression of High-Quality Images," In Proc. of SPIE, Mar. 1997, vol. 3025, 1997, pp. 62-70.

Gracias N., et al., "Fast Image Blending Using Watersheds and Graph Cuts," Image and Vision Computing, 2009, vol. 27 (5), pp. 597-607.

(56) References Cited

OTHER PUBLICATIONS

Herbst E., et al., "Occlusion Reasoning for Temporal Interpolation Using Optical Flow," Department of Computer Science and Engineering, University of Washington, Tech. Rep. UW-CSE-09-08-01, 2009.
Information technology—Coding of audio-visual objects—Part 10: Advanced Video Coding ; ITU-T H.264 ; ISO/IEC 14496-10:2012.
ITU-T Study Group 16—Video Coding Experts Group (VCEG) ; ITU-T H.265, and/or ISO/IEC 23008-2:2015.
Jakubowski M., et al., "Block-based motion estimation algorithms—a survey," Opto-Electronics Review 21, No. 1 (2013), pp. 86-102.
Kendall A., et al., "Bayesian Segnet: Model Uncertainty in Deep Convolutional Encoder-Decoder Architectures for Scene Understanding," arXiv preprint arXiv:1511.02680, 2015.
Lowe D.G., "Object Recognition From Local Scale-invariant Features," Computer vision, The proceedings of the seventh IEEE international conference on 1999, vol. 2, pp. 1150-1157.
Mitzel D., et al., "Video Super Resolution Using Duality Based TV-l 1 Optical Flow," Joint Pattern Recognition Symposium, 2009, pp. 432-441.
Pérez et al., "Poisson Image Editing," in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Schwartz E., et al., "Implementation of Compression with Reversible Embedded Wavelets," In Proc. SPIE, 1995, 12 pages.
Schwartz E.L and Ahmad Zandi and Martin Boliek, "Implementation of Compression with Reversible Embedded Wavelets", in Proc SPIE, 1995, 12 pages.
SMPTE 2073 family of encoding standards (also known as VC-5); these include without limitation: SMPTE ST 2073-1, SMPTE ST 2073-3, SMPTE ST 2073-4.
Suzuki et al., "Inter Frame Coding with Template Matching Averaging," in IEEE International Conference on Image Processing Proceedings (2007), vol. III, pp. 409-412.
Szeliski R., "Computer vision: algorithms and applications," Springer Science & Business Media, 2010.
Taubman D., et al., "Multirate 3-D Subband Coding of Video," IEEE Trans. Image Processing, Sep. 1994, vol. 3(5), pp. 572-588.
Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.
Vass J., et al., "Efficient Three-Dimensional Wavelet Codecs for Networked Video Communication," in Proceedings of IEEE International Conference on Image Processing, Kobe, Japan, Oct. 1999, pp. 565-569.
Vass J., et al., "Efficient Three-Dimensional Wavelet Codecs for Networked Video Communications," In Proceedings of IEEE International Conference on Image Processing, Kobe, Japan, Oct. 1999, pp. 565-569.
Wee S.J., et al., "A Scalable Source Coder for Hybrid HDTV Terrestrial Broadcasting System," IEEE ICIP, Austin, Texas, Oct. 1994, pp. 238-242.
Wu F., et al., "A Framework for Efficient Progressive Fine Granularity Scalable Video Coding", IEEE Trans. Circuits and Systems for Video Technology, Mar. 2001, vol. 11(3), pp. 332-344.
Xiao J., and Quan L., "Multiple View Semantic Segmentation for Street View Images," 2009 IEEE 12th International Conference on Computer Vision, 2009, pp. 686-693.
Xiong Y., et al., "Gradient Domain Image Blending and Implementation on Mobile Devices," International Conference on Mobile Computing, Applications, and Services, Springer Berlin Heidelberg, 2009, pp. 293-306.
Zandi A., et al., "CREW: Compression with Reversible Embedded Wavelets," Data Compression Conference, 1995, pp. 212-221.
Zhai et al., "A Low Complexity Motion Compensated Frame Interpolation Method," in IEEE International Symposium on Circuits and Systems (2005), pp. 4927-4930.
Zhang., "A Flexible New Technique for Camera Calibration" IEEE Transactions, dated Nov. 2000, vol. 22, No. 11, pp. 1330-1334.
PCT Application PCT/US02/20536 International Search Report dated Nov. 5, 2002, 32 pages.
U.S. Appl. No. 10/183,090, filed Jun. 26, 2002 and abandoned Aug. 28, 2006, 35 pages.
U.S. Appl. No. 10/183,090 Non-Final Rejection dated Jun. 21, 2005, 9 pages.
U.S. Appl. No. 10/779,335 Final Rejection dated May 26, 2009, 11 pages.
U.S. Appl. No. 10/779,335 Non-Final Rejection dated Mar. 3, 2010, 18 pages.
U.S. Appl. No. 10/779,335 Non-Final Rejection dated Dec. 3, 2008, 9 pages.
U.S. Appl. No. 11/689,975 Non-Final Rejection dated Sep. 2, 2010, 6 pages.
U.S. Appl. No. 10/779,335 Final Rejection dated Nov. 22, 2010, 20 pages.
U.S. Appl. No. 13/196,175, Non-Final Rejection dated Dec. 28, 2011, 10 pages.
United States Office Action for U.S. Appl. No. 13/113,950, dated Oct. 10, 2014, 10 pages.
United States Office Action for U.S. Appl. No. 13/113,950, dated Jan. 2, 2015, 10 pages.
United States Office Action for U.S. Appl. No. 13/113,950, dated Apr. 3, 2014, 8 pages.
United States Office Action for U.S. Appl. No. 13/113,950, dated Dec. 16, 2013, 9 pages.
United States Office Action for U.S. Appl. No. 13/113,950, dated Jun. 11, 2013, 8 pages.

ENCODING AND DECODING SELECTIVELY RETRIEVABLE REPRESENTATIONS OF VIDEO CONTENT

PRIORITY AND CROSS-REFERENCE TO RELATED APPLICATIONS

This application is a continuation of and claims priority to co-pending U.S. patent application Ser. No. 14/340,873, entitled ENCODING AND DECODING SELECTIVELY RETRIEVABLE REPRESENTATIONS OF VIDEO CONTENT filed Jul. 25, 2014, which claims priority to U.S. patent application Ser. No. 13/113,950, entitled ENCODING AND DECODING SELECTIVELY RETRIEVABLE REPRESENTATIONS OF VIDEO CONTENT filed May 23, 2011, now U.S. Pat. No. 9,171,577, which claims priority to U.S. patent application Ser. No. 10/779,335, entitled SYSTEM AND METHOD FOR ENCODING AND DECODING SELECTIVELY RETRIEVABLE REPRESENTATIONS OF VIDEO CONTENT filed Feb. 12, 2004, now abandoned, which claims priority to U.S. Provisional Patent Application Ser. No. 60/465,595, entitled REAL-TIME HIGH-DEFINITION VIDEO EDITING THROUGH SELECTIVE DATA RETRIEVAL FROM A COMPRESSED REPRESENTATION filed Apr. 25, 2003.

This application is also related to U.S. patent application Ser. No. 10/183,090 entitled METHOD AND APPARATUS FOR REAL-TIME EDITING OF PLURAL CONTENT STREAMS filed Jun. 26, 2002, now abandoned; and co-pending U.S. patent application Ser. No. 14/852,868, entitled ENCODING AND DECODING SELECTIVELY RETRIEVABLE REPRESENTATIONS OF VIDEO CONTENT filed Sep. 14, 2015. The content of each of these applications is hereby incorporated by reference herein in its entirety for all purposes.

FIELD OF THE INVENTION

The present invention relates to the manipulation of video content. More particularly, the present invention relates to encoding video content to produce compressed video content better suited for processing (e.g., video editing) and/or presentation of high-resolution video archives.

BACKGROUND OF THE INVENTION

Standard definition (SD) television delivers a full picture to the screen approximately 30 times per second. The North American standard for SD video (NTSC) requires that that each video frame be made up of 720 by 480 pixels. Because each pixel is commonly defined by 2 bytes (other sizes can be used), standard definition TV requires a sustained data rate of approximately 20 mega bytes per second (MBps) (i.e., 720×480×30×2 bytes/s). In today's computing and disk systems, 20 MBps is only a moderate data rate, achievable without substantial expense or design restriction.

The current standards for high-definition (HD) video contemplate video data rates that are up to six times higher than that of standard definition television. As used herein, high-definition or HD refers to any video format that increases the data rate beyond that of standard definition video including applications for digital film (motion picture) production, which currently use resolutions up to 4,096 by 2,731 pixels at 24 frames per second. One such high-definition video standard (often referred to as 1080i) contains frames of 1920 by 1080 pixels at 30 frames per second. Other HD formats (e.g., 720p) increase frame rates to 60 frames per second at a resolution of 1280 by 720 pixels. Both the common 720p and 1080i HD video formats require sustained data rates over 100 MBps. At a sustained rate of 100 MBps, standard computing solutions are no longer adequate. The common expansion bus within desktop PCs (32 bit PCI) can only sustain a maximum of around 80 MBps. Individual hard drives can only sustain about 30 MBps. Editing of video requires simultaneous processing of multiple 100 MBps streams that can overwhelm the fastest workstation CPUs. Due to these combined limitations, real-time HD editing is limited to the most expensive and custom systems on the market. As video resolutions increase, the demands on the system architecture increase.

To simplify the problems presented by video production, many solutions exist today to reduce the volume of data that needs to be processed. The limitations of drive and bus speeds have been commonly solved through video compression. Compression allows for a large reduction in data rate while maintaining the visual quality of the original source material. Compression is commonplace in SD video production, yet in HD video production, compression is not typically used in today's editing systems for a variety of reasons. For example, cost-effective production-quality hardware-based compression that allows an editor to compress and decompress video without visual quality loss does not currently exist. Although hardware compression exists for use in distribution systems (e.g., satellite or terrestrial HD broadcasts), these tools do not meet production quality or architectural requirements. In addition the CPU load for software-based compression using existing technology is very high. Although software decompression can be used for single-stream HD playback, it taxes the CPU, which may already be overloaded by processing video mixes and effects. For example, playback of a single stream of HD MPEG2 will consume 70-80% of the resources of today's fastest CPUs. As a consequence, multi-stream HD decoding and mixing is beyond the capabilities of the standard PC. Further, software encoding (i.e., compression) is typically much more CPU-intensive than decoding (i.e., decompression); therefore expensive hardware is required for encoding during video acquisition.

As a consequence of the difficulties associated with video compression discussed above, commercial HD-based production systems typically use uncompressed video. This mandates that the common PC be replaced with a workstation-class machine equipped with for example, a 64-bit PCI bus and a RAID (Redundant Array of Inexpensive Disks) hard drive solution so that the required data rate can be sustained. These setups are expensive, and without compression, large quantities of disk storage are required for any long-form production.

Video editing typically involves a process that combines two or more video streams into a single video stream through application of one or more video processing filters (e.g., transitions that individually combine one or more video streams into a single video stream). Each of the video streams may be modified individually by one or more video processing filter effects. Any of the available effects can be applied to any portion or the entire video stream before and/or after a transition.

Mixing operations include a dissolve technique that generates fading from one moving video image into another, or a transitional wipe that displays two or more video images simultaneously on one output. Effects are filters that process a stream in order to change the stream's characteristic in some way. Some types of effect filters include color correction effects, which change any combination of image characteristics such as brightness, contrast, saturation and color tint, or a distortion filter that may blur or sharpen or enhance the moving image in any way.

When mixing multiple streams of video or adding special effects, most operations require access to the uncompressed image. Because there are no known alternatives to using uncompressed content when implementing edits, many editing applications simply do not offer a real-time preview (i.e., before edits are actually carried out) of editing results. Instead, to view the results of effect or transition editing in motion, the video must first be rendered. Rendering is the process of pre-computing video mixes over time (however long the processing takes), and placing the results back on disk. Video rendering performs the same mixing and effect operations as required by real-time playback; however, the results can no longer be viewed live. As a consequence, the rendering process requires that the resulting video composite must be completely written to disk before it can be viewed at normal playback speeds. In a rendered-only editing environment, the user/editor must wait before being able to view the "edit," then decide whether it needs to be changed. If it does need to be changed, then more rendering is required; thus, editing in a rendered-only editing environment can be very time consuming.

Some video editing applications alternatively scale an image down to a lower resolution during capture. In this scaling-upon-capture approach, lower resolution video previews can be seen in real-time, enabling the editor to quickly preview most editing actions. The drawback of scaling upon capture in this manner, however, is that the video must be recaptured at full resolution before the edits are actually implemented and the final-quality production can be completed. This approach to video production has been around for decades, and it is commonly called "off-line" editing.

Another approach offered attempts to overcome both the limitations of the rendering-only and scaling-upon-capture approaches by processing full-resolution HD data then resizing the output to SD for mixing and real-time presentation. Although this approach is intended to make use of existing real-time SD equipment to assist in HD editing, the HD-to-SD resizing introduces an additional processing stage after decompression, making this approach unsuitable for software-only solutions. As a hardware solution, this approach is very costly given that it requires either expensive compression chips or a system architecture with enough bandwidth (e.g., hundreds of MBps) and with enough disk capacity to store very large uncompressed HD video files.

To reduce CPU load, some video compression technologies have limited abilities to decode to a lower resolution. Common compression standards such as MPEG. JPEG, and DV, however, must fetch all data for a frame even when decoding to lower resolutions. Although modifications to the decoding procedure allow some reduction in CPU usage, the results do not offer both good image quality and reduced CPU load.

In the context of video editing, high performance of the decoding operation is important because the user/editor needs to view most editing operations at normal speed playback. Once the CPU load exceeds the system capability, however, the playback of the video will stutter or stall, preventing audio synchronization or smooth motion. Other qualities of the moving image are also important to the user/editor, such as subtleties of color shading and image definition that are used for scene selection as well as image correction. Any compromise that trades performance for artifacts, like those seen in quarter resolution DV decoding, will not be desired by the user/editor.

Conventionally, video previews are rendered by processing only the frames possible with the CPU and bandwidth resources available. In such conventional systems the previews typically stutter (non-smooth motion), and although they are not considered real-time, these systems do preserve audio synchronization by computing and presenting some frames at their correct display time. For example, if the current level of processing takes twice as long as it would in a real-time system, a frame will be skipped so that the next frame is displayed at the correct time. In this situation, playback will occur at half the normal frame rate. Stutter is obvious as the interim frames are not presented to the display; these missing frames contain motion information now missing from the final output. This form of preview introduces temporal artifacting, another undesirable characteristic in video production.

Referring to FIG. 1, shown is a screen capture of a typical desktop editing environment. Shown is a bin of source material 100 containing many video sequences, titles, graphics and audio; a timeline of edit decisions 102 where the editor places and reorders source material (mixing them with transitions and effects) a control panel 104 for manipulating the parameters for effects and transitions; and one or two preview windows 106 in which the source and edited output material can be viewed. The size of the video window 106 is dependent on the available screen space, not the resolution of the source image because video is scaled to fit comfortably in the computer's display hardware. This window area is typically the same size for HD as it is for SD video production (although the aspect ratio commonly is different: 16:9 vs 4:3). The resolution of most of today's high-definition frames will not fit within the window of this editing environment, however, so the image is typically scaled down by the display device as part of today's editing process.

SUMMARY OF THE INVENTION

In one embodiment the invention may be characterized as a method for processing a video stream, the method including the steps of converting at least one frame of said video stream into a plurality of data components, wherein said at least one frame is characterized by an original resolution and each of said plurality data components is representative of a portion of said at least one frame; and storing each of said plurality data components so as to generate a plurality of stored data components, wherein each of said plurality of stored data components is combinable with at least one other of said plurality of stored data components to produce a resultant frame of lower resolution than said original resolution.

In another embodiment the invention may be characterized as a video frame storage structure disposed to store information useable to produce video frames of different resolutions, the structure including a lowest resolution data component capable of producing a low-resolution video frame; and a plurality of high frequency data components. The lowest resolution data component and one of said high frequency data components are combinable to produce a higher resolution frame than said low resolution frame.

In yet another embodiment, the invention may be characterized as a processor readable medium including instructions encoded thereon for processing a video stream, the instructions including converting at least one frame of said video stream into a plurality of data components, wherein said at least one frame is characterized by an original resolution and each of said plurality data components is representative of a portion of said at least one frame; and storing each of said plurality data components so as to generate a plurality of stored data components, wherein each of said plurality of stored data components is combinable with at least one other of said plurality of stored data components to produce a resultant frame of lower resolution than said original resolution.

In another aspect of the present disclosure, a method for processing compressed video data is disclosed. In one embodiment thereof, the method includes: storing, in a storage structure, for each of a plurality of frames of video having a corresponding image at an original display resolution, a corresponding plurality of image components representative of the frame of video, the plurality of image components including a base image component associated with a given display resolution, and one or more additional image components associated with display resolutions greater than or equal to the given resolution and less than or equal to the original resolution, and the base image component comprising the corresponding image at the given display resolution; selecting, based at least on a first processing load of a decoder, a first display resolution at which to display a first of the plurality of frames of video; retrieving from the storage structure a first subset of the plurality of image components corresponding to the first frame of video, the first subset of image components selected based at least on the first display resolution and including the base image component corresponding to the first frame of video; decoding the retrieved first subset of image components to generate a first modified frame of video at the first display resolution, the first modified frame of video comprising the image corresponding to the first frame of video; based at least on a change in processing load of the decoder to a second processing load, selecting, based on the second processing load, a second display resolution at which to display a second frame of video; retrieving from the storage structure a second subset of the plurality of image components corresponding to the second frame of video, the second subset selected based at least on the second display resolution and including the base image component corresponding to the second frame of video; and decoding the retrieved second subset of image components to generate a second modified frame of video at the second display resolution, the second modified frame of video comprising the image corresponding to the second frame of video.

In another aspect of the present disclosure, a system for processing compressed video data is disclosed. In one embodiment thereof, the system includes: a memory configured to store, in a storage structure, for each of a plurality of frames of video, a corresponding plurality of image components representative of the frame of video, the frame of video comprising a corresponding image at an original resolution, the plurality of image components including a base image component comprising the corresponding image at a base resolution and one or more additional image components associated with resolutions greater than or equal to the base resolution and less than or equal to the original resolution; a decoder in data communication with at least the memory and configured to, for each of the plurality of frames of video, decode a retrieved subset of the plurality of image components corresponding to the frame of video to generate a corresponding modified frame of video, the corresponding modified frame of video comprising the image corresponding to the frame of video at a selected display resolution; a resolution selection apparatus in data communication with at least the decoder and configured to: select a first display resolution at which to display a first of said plurality of frames of video, the selection based at least on a first processing load of the decoder; and in response to a change in processing load of the decoder to a second processing load, select a second display resolution, the second display resolution selected based at least on the second processing load; and a data component apparatus in data communication with at least the memory and configured to: retrieve a first subset of a plurality image components corresponding to the first frame of video from the storage structure, the first subset selected based at least on the first display resolution, the first subset including a base image component corresponding to the first frame of video; and retrieve a second subset of a plurality of image components corresponding to a second of said plurality of frames of video from the storage structure, the second subset selected based at least on the second display resolution, the second subset including a base image component corresponding to the second frame of video.

In another aspect of the present disclosure, a non-transitory computer-readable storage medium is disclosed. In one embodiment, the non-transitory computer-readable storage medium stores executable computer program instructions thereon, the program instructions configured for processing video data and that, when executed by a computerized device, cause the computerized device to perform operations including: storage, in a storage structure, for a first of a plurality of frames of video comprising a corresponding image at an original resolution, a corresponding first plurality of image components representative of the first frame of video, the first plurality of image components including: (i) a base image component associated with a base resolution, and (ii) one or more additional image components associated with resolutions greater than the base resolution and less than or equal to the original resolution;

storage, in the storage structure, for a second of the plurality of frames of video comprising a corresponding image at an original resolution, a corresponding second plurality of image components representative of the second frame of video, the second plurality of image components including: (i) a base image component associated with a base resolution, and (ii) one or more additional image components associated with resolutions greater than the base resolution and less than or equal to the original resolution; a first display resolution at which to display the first frame of video, the selection based at least on a first processing load; retrieve a subset of the first plurality of image components from the storage structure, the subset of the first plurality of image components being selected based at least on the first display resolution, the subset of the first plurality of image components including the base image component corresponding to the first frame of video; decode the retrieved subset of the first plurality of image components to generate a first modified frame of video comprising the image corresponding to the first frame of video represented at the first display resolution; based at least on a change in the processing load to a second processing load, select a second display resolution at which to display a second frame of video; retrieve a subset of the second plurality of image components corresponding to the second frame of video from the storage structure, the subset of the second plurality of image components being selected based at least on the second display resolution, the subset of the second plurality of image components including the base image component corresponding to the second frame of video; and decode the retrieved subset of the second plurality of image components to generate a second modified frame of video comprising the image corresponding to the second frame of video represented at the second display resolution.

In another aspect of the present disclosure, a non-transitory computer-readable storage medium is disclosed. In one embodiment, the non-transitory computer-readable storage medium stores executable computer program instructions thereon, the program instructions configured for processing video data and that, when executed by a first computerized device, cause the first computerized device to perform operations on a plurality of frames of video data, the plurality of frames each comprising a corresponding original resolution, the operations including: selection of a first display resolution at which to display a first of said plurality of frames of video data, the selection based at least on a first processing load of the first computerized device; retrieval of a subset of a plurality of image components associated with a first frame of the video data from a storage apparatus in data communication with the first computerized device, the subset selected based at least on the first display resolution, the subset of the first plurality of image components including at least a base image component corresponding to the first frame; decode of the retrieved subset to generate a first modified frame of video data comprising the image corresponding to the first frame, the image represented at the first display resolution; detection of at least a change of processing load of the first computerized device from the first processing load to a second processing load; selection of a second display resolution at which to display a second frame of video, the selection of the second frame of video based at least on the second processing load; retrieval of a subset of a plurality of image components associated with the second frame of the video data from the storage apparatus, the subset of the plurality of image components associated with the second frame of the video data selected based at least on the second display resolution, the subset of the second plurality of image components including at least a base image component corresponding to the second frame; and decode of the retrieved subset of the plurality of image components associated with the second frame of the video data to generate a second modified frame of video data comprising the image corresponding to the second frame, the image represented at the second display resolution; wherein the pluralities of image components representative of the respective first and second frames of video data each include: (i) a base image component associated with a prescribed resolution of the respective first or second frame, and (ii) one or more additional image components associated with resolutions greater than the prescribed resolution and less than or equal to the original resolution of the respective first or second frame.

DETAILED DESCRIPTION OF THE INVENTION

Figure 2:
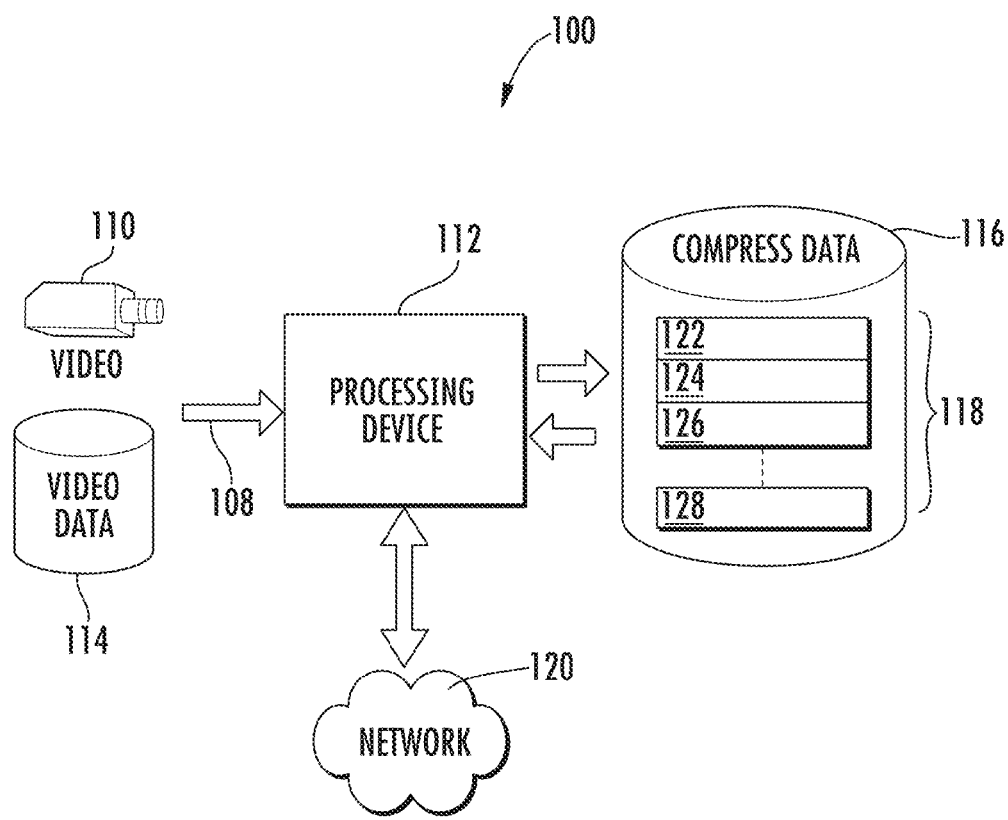
FIG. 2 provides an overview of the computing environment in which an encoding and decoding system of the present invention may be implemented.

FIG. 2 is a block diagram illustrative of a video processing system 100 configured to encode and decode video content in accordance with the invention. In the embodiment of FIG. 2, a source video stream 108 (e.g., sequences of frames of digital images and audio) is received at a processing unit 112, which is configured to encode the source video stream 108 so as to generate a collection of selectively decodable data components 118. The source video stream may originate from a variety of sources including a video camera 110 and a data storage unit 114, and may be compressed upon capture or stored first. As one of ordinary skill in the art will appreciate, the source video stream 108 may be conveyed by a variety of means including IEEE-1394 compliant cabling, PCI bus, HD/SDI communications link, any 802.11 standard, etc. Also shown is a compressed data storage unit 116 configured to store the collection of data components 118 that are produced from the source video stream 108, and a network 120 (e.g., the Internet) disposed to carry a video stream comprised of one or more of the data components 118 to remote locations.

In operation, the processing unit 112 receives the source video stream 108, which may be in a compressed (e.g., MPEG) or uncompressed form. If the source video stream 108 is compressed, it is decompressed to an uncompressed form. The uncompressed video stream is then compressed into a form that allows for selected decompression to achieve multiple resolutions and frame rates of video output.

In the exemplary embodiment, the processing device 112 encodes the source video stream 108 into a collection of N data components 118 that can be efficiently decoded into a video stream at the original resolution and/or one or more video streams at lower resolution with reductions in resolutions horizontally, vertically, temporally or combination of the resolution reductions, without increasing the data size of the compressed representation.

As shown, the collection of N data components 118 includes a lower resolution component 122 and other data components 124, 126, 128. As described herein, a video stream with the same resolution as the source video stream may be assembled by using all the data components 122, 124, 126, 128 or lower resolution video streams may be generated using different combinations of the data components 122, 124, 126, 128. For example, the lower resolution data component 122 may be used alone to provide a thumbnail image of the content of the video stream 108, and the lower resolution data component 122 along with a second data component 124 may be decoded for previewing video edits. If a higher resolution is desired, the lower resolution data component 122 along with the second and third data components 124, 126 may be decoded.

Beneficially, the encoding process is adaptable so as to allow the number N of data components 118 and the content of each of the data components 122, 124, 126, 128 to vary depending upon several factors. For example, the encoding may be dependant upon the type of the source video stream 108 (e.g., the resolution and/or frame rate), the video processing work load, video data capacity, the processing to be carried out after the source video stream 108 is encoded (e.g., editing and/or viewing) and hardware constraints (e.g., processor speed and/or the size of a user's display).

The ability to assemble one or more lower resolution representations of the source video stream 108 has several advantages. For example, software-based real-time high-definition video production may be carried out on common desktop computers without compromising either the image quality or the editing process. In addition, decoding is often faster than prior art (e.g., MPEG) video streams because one or more lower resolution representations of the source video stream 108 are available without having to decode the entire collection of data components 118. Moreover, a variety of resolutions (e.g., the lower resolution component 122 or a combination of data components) are available for transmission over bandwidth-limited channels (e.g., the network 120), while maintaining the ability to reassemble the source video stream 108 at its original resolution from the lower resolution component 122 and other data components 124, 126, 128.

In the context of video editing, the encoding and decoding process of the exemplary embodiment allows high-definition video content to be edited in real time without off-lining (i.e., full resolution video is captured). This on-line approach allows all the image data to be available to the user/editor, without recapturing, which is required by off-line solutions. In addition, multiple streams of video can be mixed without the editor having to wait for a time-consuming rendering process.

Real-time video editing performance is achieved by computing video mixes and effects on a reduced-resolution representation of the video (e.g., by decoding fewer than all of the data components 118) to provide a fast preview. By reducing the number of pixels per frame, the processing load is equally reduced. Unlike existing solutions that discard data during capture, or CPU intensive approaches that process the full image then scale to a smaller image, the encoding process of the exemplary embodiment generates data components 118 that are selectively decodable so that only the data components necessary to generate a resolution are decoded and processed without a substantial amount of data being lost. As a consequence, processing load is reduced throughout the system because each processing stage (e.g., decoding, transitions, effects and display) can be done at a resolution other than the original captured resolution. The decompression, the mixing and effects, and the final presentation all occur without the use of a resizing component, which reduces CPU load. If the full-resolution data is desired (e.g., by a video editor during editing), the data is available to reconstruct a full resolution image by decoding all of the data components 118.

To greatly reduce the processing load and achieve source resolution independence, the architecture of the compression engine used to compress the source data stream 108 and the form of the resulting compressed data structure after compression are very significant. The prior art compression technologies suffer from image artifacts or only provide a moderate reduction in CPU load when the output resolution is reduced due to the structure of their compressed data. By structuring the compressed data components 118 to enable direct retrieval at a reduced image resolution as part of the decompression stage, significant system resources (CPU cycles and disk bandwidth) can be saved, and depending upon the number of data components 118 decoded, the lower resolution image, under typically viewing conditions, has perceptively the same image quality and color definition as a full-resolution decoded image.

A video editing system typically will experience a variable processing load as a function of the number of clips mixed together and the number of video filters applied. For example, when a video stream is dissolving (i.e., fading) into another video sequence, the system's processing load at least doubles because there are two streams being decoded and mixed. Today's editing systems may play a single HD video stream smoothly, but the processing that is required for a simple mix forces the playback to stutter, and the editing system must drop video frames to preserve audio synchronization.

An editing system using a variable resolution decoding technique as described herein provides many options to solve this problem. The simplest solution is to select a decoding resolution that has "light" enough decoding requirements so that the timeline plays back without stuttering. This technique works well with high definition video because even a reduced resolution version of the original source stream (e.g., a preview resolution) may exceed the display area available to the user/editor. In accordance with an exemplary embodiment, the resolution that is decoded for a preview is dynamically adjusted based upon the system load. As the system load increases, the decoding load is reduced accordingly by reducing the preview resolution.

Figure 3:
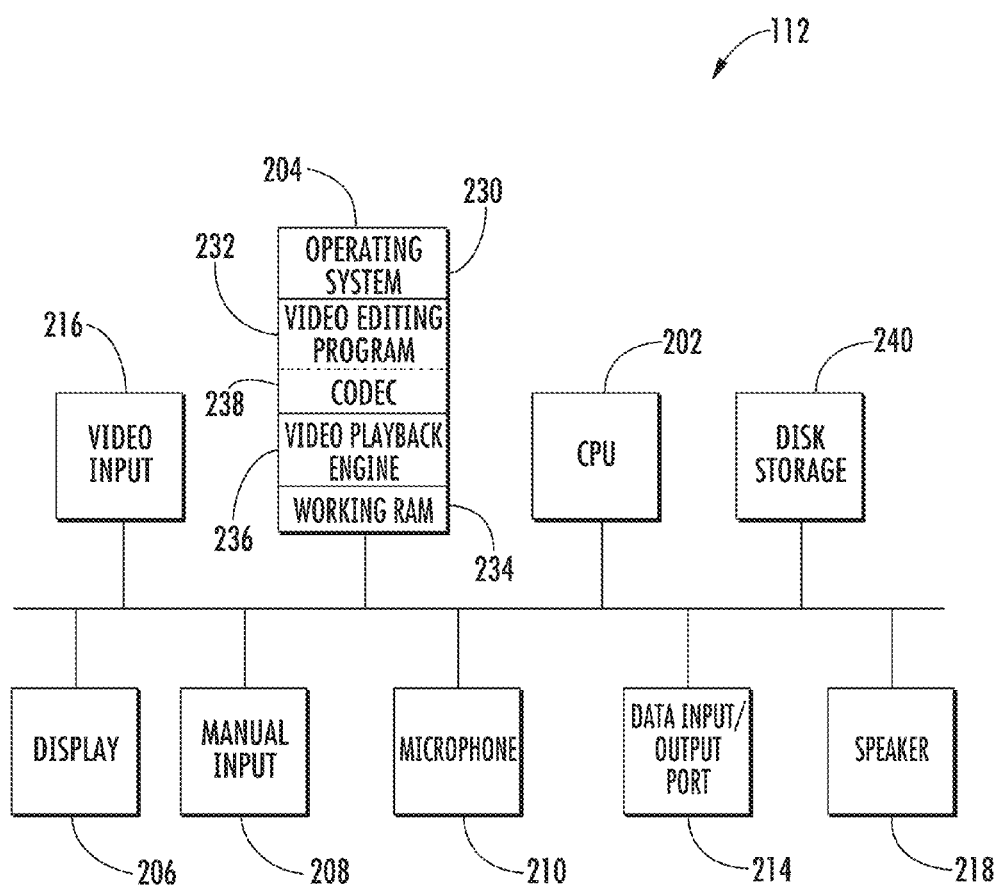
FIG. 3 is a block diagram illustrating the principal components of a processing unit of the inventive system configured to encode a video stream for subsequent selective multi-resolution decoding in accordance with the present invention.

FIG. 3 is a block diagram illustrating the principal components of the processing unit 112 of FIG. 2 as configured in accordance with an exemplary implementation of the present invention. In the exemplary implementation, the processing unit 112 comprises a standard personal computer disposed to execute video editing software created in accordance with the principles of the present invention. Although the processing unit 112 is depicted in a "stand-alone" arrangement in FIG. 2, in alternate implementations the processing unit 112 may function as a video coder/decoder (CODEC) incorporated into a video recorder or video camera or part of a non-computer device such as a media player like DVD or laserdisc player.

As shown in FIG. 3, the processing unit 112 includes a central processing unit ("CPU") 202 adapted to execute a multi-tasking operating system 230 stored within system memory 204. The CPU 202 may comprise any of a variety of microprocessor or micro-controllers known to those skilled in the art, such as a Pentium-class microprocessor. As is described further below, the memory 204 stores copies of a video editing program 232 and a video playback engine 236 executed by the CPU 202, and also includes working RAM 234.

The CPU 202 communicates with a plurality of peripheral equipment, including video input 216. Additional peripheral equipment may include a display 206, manual input device 208, microphone 210, and data input port 214. Display 206 may be a visual display such as a cathode ray tube (CRT) monitor, a liquid crystal display (LCD) screen, touch-sensitive screen, or other monitors as are known in the art for visually displaying images and text to a user. Manual input device 208 may be a conventional keyboard, keypad, mouse, trackball, or other input device as is known in the art for the manual input of data. Microphone 210 may be any suitable microphone as is known in the art for providing audio signals to CPU 202. In addition, a speaker 218 may be attached for reproducing audio signals from CPU 202. It is understood that microphone 210 and speaker 218 may include appropriate digital-to-analog and analog-to-digital conversion circuitry as appropriate.

Data input port 214 may be any data port as is known in the art for interfacing with an external accessory using a data protocol such as RS-232, USE, or IEEE-1394. Video input 216 may be a video capture card or may be any interface as known in the art that receives video input such as a camera, media player such as DVD or D-VHS, or a port to receive video/audio information. In addition, video input 216 may consist of a video camera attached to data input port 214.

In the exemplary implementation, a CODEC 238 is implemented within a video editing program 232 and is configured to encode a source video stream (e.g., the source video stream 108) into discrete data components (e.g., the collection of data components 118) that are stored (e.g., in data storage device 116 and/or disk storage 240) for later retrieval. The CODEC 238 of the video editing program 232 is also capable of decoding one or more of the stored data components and converting them into a video stream of lower resolution than the source video. A user/editor may then preview the effect of edits on the lower resolution video stream using the video editing program 232. In one embodiment, the video editing program 238 is realized by adapting readily available video editing software to incorporate the inventive CODEC 238. In one embodiment, the video editing program 238 is realized by implementing the CODEC 238 within the framework of the Adobe® Premiere® video editing software.

A source video stream (e.g., the source video stream 108) may be retrieved from the disk storage 240 or may be initially received via the video input 216 and/or the data input port 214. The source video stream may be uncompressed video data or may be compressed according to any known compression format (e.g., MPEG or JPEG).

Figure 1:
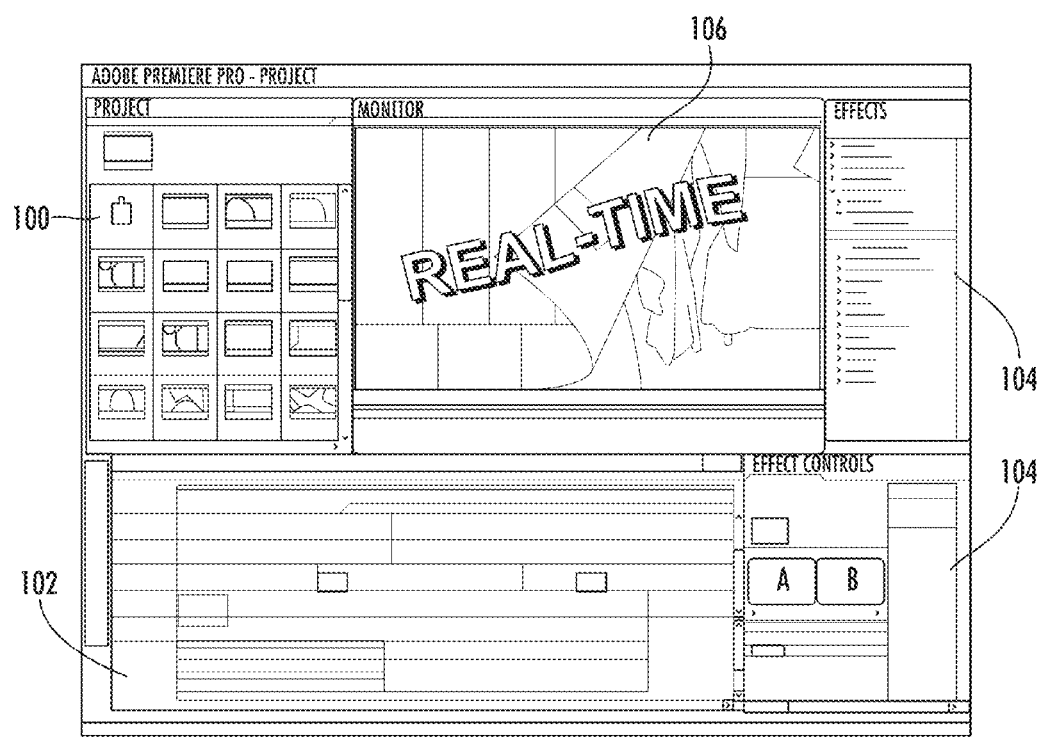
FIG. 1 is a screen capture showing the layout of a typical video editing environment running on a desktop computer.

Disk storage 240 may be a conventional read/write memory such as a magnetic disk drive, floppy disk drive, compact-disk read-only-memory (CD-ROM) drive, digital video disk (DVD) read or write drive, transistor-based memory or other computer-readable memory device as is known in the art for storing and retrieving data. The disk storage 240 may consist of the data storage unit 116 described with reference to FIG. 1 or may be realized by one or more additional data storage devices. For example, disk storage 240 may be a distributed collection of data storage devices, and the stored data components (e.g., the data components 122, 124, 126, 128) may be stored among the storage devices to facilitate faster access to the data. As a further example, lower resolution components 122 may be stored on one storage medium while data components with data for higher resolution representations may be stored on one or more other disks to reduce the amount of seek time to find the data that is used most often. Additionally, the disk storage 240 may be remotely located from CPU 202 and connected thereto via a network (not shown) such as a local area network (LAN), a wide area network (WAN), or the Internet.

The capture process that enables video to be manipulated in a compressed form is dependent on the source of the video material. Video from HD video cameras or HD tape decks are either delivered in a compressed or uncompressed form. On a fast computing system, uncompressed data can be encoded in real-time, and only the compressed result will be stored to disk 240, which provides a substantial reduction in the size and expense of the disk system used relative to a disk system required to store the uncompressed data.

For a compressed video source, this data will need to be decoded before it is recompressed in accordance with the inventive encoding process described herein. A very fast system will be able to perform this operation in real-time, but due to the increased load of decoding the compressed format, many otherwise suitable editing systems will not have the CPU resources to perform a full-resolution decode and a full-resolution encode at the video frame rate. To enable a wider range of computers (e.g., including slower computers) to capture, edit and output video content, a disk spooling technique may be used to distribute the CPU load required for decoding and encoding over a longer time.

In an exemplary disk spooling embodiment, compressed video from the source (e.g., video camera 240 or data storage 114) is received via the video input or data input port 214 at normal speed. This compressed data stream is spooled (buffered) onto the disk 240, where it can be fetched as soon as the CPU 202 is free to convert more frames. The writing and reading of the disk 240 can happen simultaneously, so it is not necessary for the capture to complete before the conversion can start. Compressed frames read from the disk 240 are then decompressed and recompressed by the CODEC 238 before the result is stored back to disk 240. It should be recognized that the disk system used for spooling can be a different disk than the disk 240 storing the final result.

Overview of Wavelet-Based Encoding for Selective Decoding

In the exemplary embodiment, the CODEC 238 operates according to a symmetric wavelet-based encoding methodology, which incorporates spatial, and in some instances, temporal compression techniques to generate data components that are stored for subsequent selective decoding. Specific aspects of this methodology are further described in co-pending U.S. patent application Ser. No. 10/183,090 entitled "Method And Apparatus For Real-Time Editing Of Plural Content Streams", filed on Jun. 26, 2002, which is incorporated herein by reference.

The nature of this compression technology is that it encodes the original image data as smaller and smaller representations of the image, which is a property common to wavelet image compression. In this compression technique, each smaller image is a filtered average of the higher resolution stage above, making each stage ideal for representing a lower resolution video without the artifacts of other compression systems.

Figure 4:
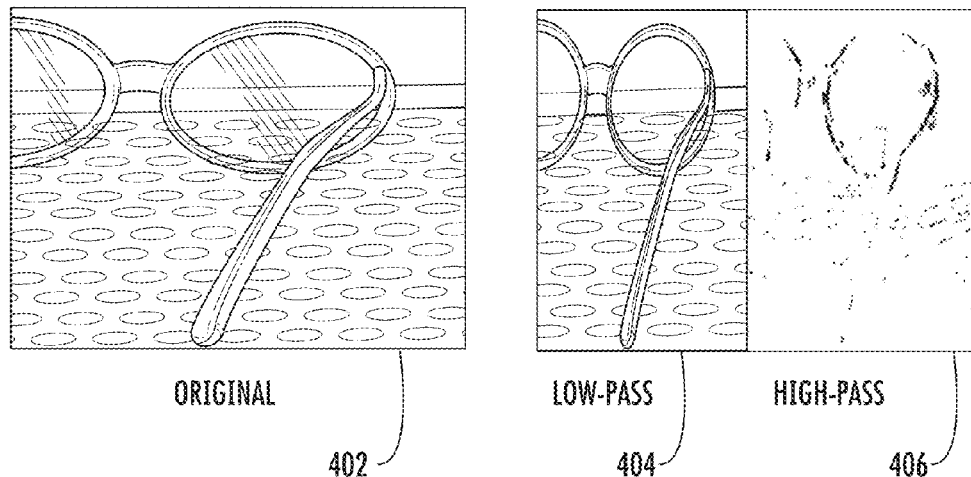
FIG. 4 illustratively represents the filtering of a video frame using sub-band coding techniques in order to produce high frequency sub-band information and low frequency sub-band information.

To achieve spatial compression, the inventive CODEC 238 employs sub-band coding techniques in which the subject image is compressed though a series of horizontal and vertical filters. Each filter produces a high frequency (high-pass) component and a low frequency (low-pass) component. As shown in the exemplary illustrative representation of FIG. 4, an original video frame 402 of 1920× 1080 pixels may be filtered using sub-band coding techniques to produce high frequency sub-band information 406 of 960×1080 pixels and low frequency sub-band information 404 of the same size. Wavelet filters typically down-sample the filtered result by half so the low-pass and high-pass sub-bands are half as wide. The high frequency sub-band information 406 is representative of edges and other discontinuities in the image while the low frequency sub-band information 404 is representative of an average of the pixels comprising the image. This filter can be as simple as the sum (low pass) and difference (high pass) of the 2-point HAAR transform characterized as follows:

For every pixel pair. $X_i$ and $X_{i+1}$
one low-pass output: $L_j=X_i+X_{i+1}$
and one high-pass output: $H_j=X_i-X_{i+1}$ In the exemplary embodiment all multiplication and division computations required by the transform are capable of being carried out using shift operations. The above transform may be reversed, or decoded, as follows:

$$X_i=(L_j+H_j)\div 2 \text{ and } X_{i+1}=(L_j-H_j)\div 2$$

As is known, the HAAR transform is one type of wavelet-based transform. The low-pass or "averaging" operation in the above 2-point HAAR removes the high frequencies inherent in the image data. Since details (e.g., sharp changes in the data) correspond to high frequencies, the averaging procedure tends to smooth the data. Similarly, the differencing operation in the above 2-point HAAR corresponds to high pass filtering. It removes low frequencies and responds to details of an image since details correspond to high frequencies. It also responds to noise in an image, since noise usually is located in the high frequencies.

Figure 5:
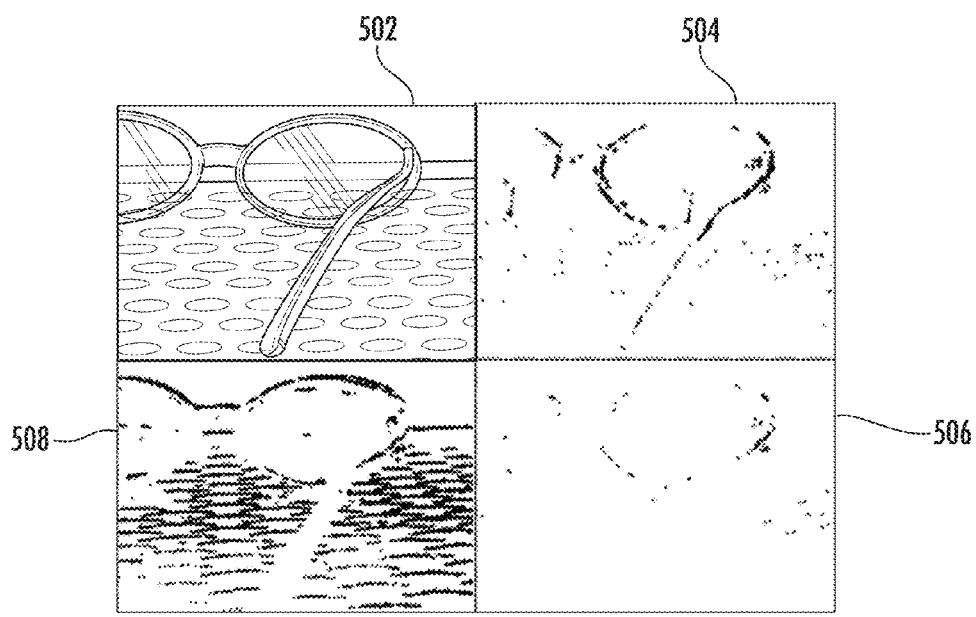
FIG. 5 depicts the manner in which a pair of sub-band image information sets derived from a source image can be vertically filtered in the same way to produce four additional sub-band information sets.

Continuing with the above example, the two 960×1080 sub-band image information sets 404, 406 derived from the 1920×1080 source image 402 can then be HAAR filtered in the vertical dimension to produce an additional low-pass sub-band image 502 of 960×540 pixels and three high-pass sub-band image information sets 504, 506, 508 as depicted in FIG. 5. Each such sub-band image information set corresponds to the transform coefficients of a particular high-pass or low-pass sub-band. In order to effect compression of each high-pass sub-band 504, 506, 508 its transform coefficients are (optionally quantized), run-length encoded and entropy (i.e., statistical or variable-length) encoded. In this regard the blank areas in the high-pass sub-band image information sets are comprised largely of "zeros", and are therefore very compressible.

Figure 6:
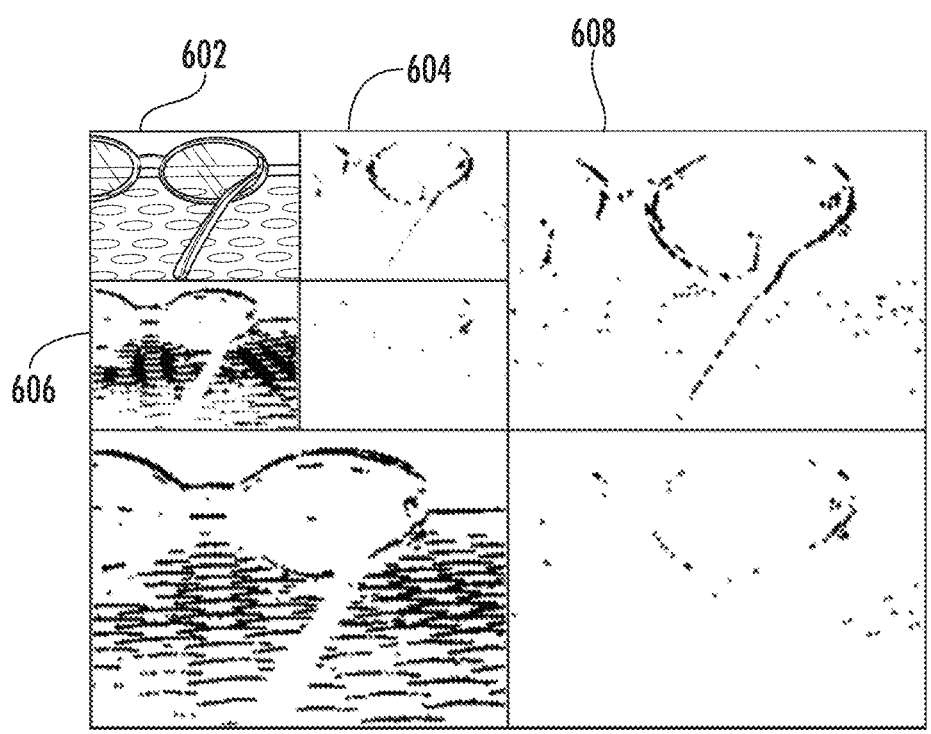
FIG. 6 illustratively depicts a way in which increased compression may be achieved by further sub-band processing a low-pass sub-band image information set.

As shown in FIG. 6, increased compression may be achieved by further sub-bend processing the low-pass sub-band image information set 502 of FIG. 5 to generate another low-pass image component 602 and high-pass image components 604, 606, 608. Compression of low-pass image information may be performed again and again as described with reference to FIGS. 4 through 6 to generate lower and lower resolution low-pass image components and additional high-pass image components. Typically, however, three to four iterations of the above-described compression typically provides sufficient compression for most applications. It should be noted that it is also possible to apply further wavelet transforms to high pass data before entropy encoding. This allows some high-pass sub-bands that may have image additional image redundancy, such as the motion difference sub-band, to be compressed more without quality loss.

To improve the extent of compression beyond that possible using the "2,2" wavelet transforms illustrated above, longer filters such as those based upon "2,6" and the "5,3" wavelet transforms may also be employed. Both of the these wavelet transforms also exhibit the characteristics of HAAR wavelets in only requiring shifts and adds in order to perform the desired transform, and thus may be computed quickly and efficiently. The nomenclature arises as a result of the fact that a "2,6" wavelet transform is predicated upon 2 low-pass filter elements and 6 high-pass filter elements. Such a 2,6 wavelet transform capable of being implemented within the symmetric CODEC may be characterized as follows:

For every pixel pair: $X_{i-2}$ through $X_{i+3}$
one low-pass output: $L_j=X_i+X_{i+1}$
and one high-pass output: $H_j=(-X_{i-2}-X_{i-1}+8\cdot X_i-8\cdot X_{i+1}+X_{i+2}+X_{i+3})/8$ The above 2,6 transform may be reversed, or decoded, as follows:

$$X_i=((L_{j-1}+8\cdot L_j-L_{j+1})+8)+H_j)\div 2$$

$$\text{and } X_{i+1}=((L_{j-1}+8\cdot L_j-L_{j+1})+8)-H_j)\div 2$$

Use of a longer wavelet results in the use of more of the pixels adjacent an image area of interest in computation of the sum and difference (low and high-pass) sub-bands of the transform.

In several embodiments, the wavelets that are selected share the characteristic of being mathematically reversible. A mathematically reversible transform can perfectly reconstruct the input data from the transformed data without error. For video compression, transform reversibility means it is possible for an encode operation to be completely reversed at the decoding stage to exactly reproduce the original input. Compression of this type is commonly referred as "lossless" compression. Applications for lossless video compression occur in the fields of high-end television and film production, and for digital media archiving. There are many applications for video compression, however, that do not require full reversibility, and the increased amount of compression provided by these "lossy" compression techniques is often desired (e.g., for distribution or storage needs). Some examples of known lossy compression techniques include MPEG, DV and JPEG.

By selecting reversible transforms, the same encoding structure can be used for either lossy or lossless compression as needed. For compression to be truly "lossless," not only must the transform be reversible, but also no other data can be discarded during the encoding process. In accordance with one embodiment of the present invention, to achieve lossless compression, no quantization is applied to the transformed data, but this is certainly not the only way to achieve lossless encoding.

To achieve greater compression, a lossless CODEC design can quantize the output coefficients before entropy encoding, which results in a lossy result Careful selection of quantization can typically reduce the data rate 2 to 3 times without any visible artifacts, which is often termed "visually lossless," while it is still mathematically lossy.

Advantageously, the wavelet encoding process of some embodiments described further herein allow the user to select whether video is compressed in a visually lossless or a truly mathematically lossless manner. Various techniques for lossless decoding are described further herein with reference to FIGS. 10A-10C, and in these embodiments, additional data components are added to the compressed representation to preserve any data that may be lost during compression (e.g., due to rounding or overflow). As a consequence, a user is able, at their option, to decode these rounding/overflow data components when the user needs full precision or to bypass them when a visually lossless representation is sufficient. In other words, it is possible for a user to preview (decode) in a visually lossless manner from data stored during a mathematically lossless encoding process.

In particular, for a video stream encoded according to lossless techniques, the decoding can be to a lower spatial or temporal resolution than that of the original, to the full resolution with some loss that is not perceivable, or to the original resolution without any loss. Each one of these decodable modes offers enhanced flexibility to the end user; however, the greater number of data components used to reconstruct the image increases the system load.

An application where decoding to full resolution (but not mathematically lossless) is beneficial is the presentation (playback) of a film or television production onto a large screen. In such an application, the full resolution will be appreciated, but the subtly of mathematical precision will not be noticed by the audience, and the saved system load reduces the cost of the presentation equipment.

In the context of video editing, an application where mathematically lossless precision is demanded is during production workflow where multiple generations of encoding and decoding stages are required to complete a film or television production. These stages may include image enhancement, special effects manipulation, color correction and titling where each stage may be performed on the output of the previous stage, commonly on a different system. If small losses were added at each stage, the final result may contain visible compression artifacts. By having no loss between stages, no compression artifacts are added. Advantageously, while lossless decoding and encoding is used for the final "mix-down" at each stage in the production workflow, within each stage all the different preview modes (i.e., lower resolution data components) are available to enhance productivity.

In addition to spatial compression, the CODEC 238 of the exemplary embodiment is also capable of temporally compressing a source image. As discussed further herein, temporally compressing a source image is advantageous in certain situations (e.g., when the source video stream has a high frame rate) to achieve an even greater reduction in CPU requirements during a preview of the video content.

In prior systems, CPU load reduction is achieved by skipping frames then only processing every second or third (or fourth, etc.) frame of a video sequence. The prior systems that do not use temporal compression simply bypass the interim frames, and hence, produce a stuttering sequence. Although there are prior systems that utilize temporal compression to reduce the number of frames, they are significantly different from the techniques disclosed further herein, and typically do not provide a smooth motion presentation.

In an original sequence that contains an object in motion, the object travels according to the following sequence:

| Time 1 | Frame 1 | object moving between points A and B |
| Time 2 | Frame 2 | object moving between points B and C |
| Time 3 | Frame 3 | object moving between points C and D |
| Time 4 | Frame 4 | object moving between points D and E |

As the sequence set forth below indicates, dropping Frames 2 and 4 and repeating Frames and 3 (a common technique) results in the appearance of stuttering-type motion because the motion between B and C and D and E is missing.

| Time 1 | Frame 1 | object moving between points A and B |
| Time 2 | Frame 1 | object moving between points A and B -- missing motion |
| Time 3 | Frame 3 | object moving between points C and D |
| Time 4 | Frame 3 | object moving between points C and D -- missing motion |

Figure 7:
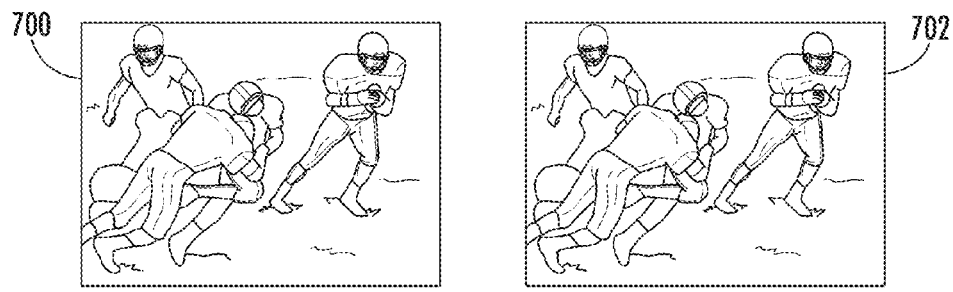
FIG. 7 depicts two adjacent frames of a group of pictures.
Figure 8:
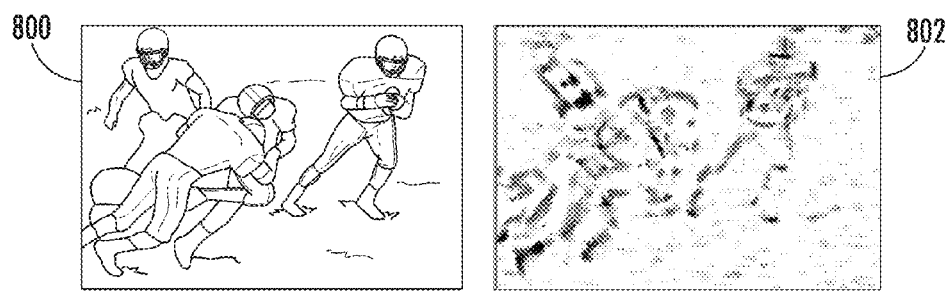
FIG. 8 illustratively depicts a way in which the two adjacent video frames of FIG. 7 are wavelet compressed into a sum frame containing motion blur and a high-frequency difference frame.

In contrast, the CODEC 238 of the present embodiment, breaks from traditional wavelet architectures by wavelet-filtering two or more adjacent frames to achieve temporal compression (exploiting the image redundancy between frames). Referring to FIG. 7, two adjacent video frames 700, 702 are filtered to produce an average frame 800 shown in FIG. 8 that contains all the motion of the two source frames 700, 702. Also shown in FIG. 8 is a temporal high pass frame 802, which also results from the filtering of source frames 700, 702. This temporal high pass frame 802 may then be entropy encoded to compress the temporal high pass data. Alternatively, the temporal high pass frame 802 may be spatially compressed by applying one or more wavelet transforms before entropy encoding to help achieve greater compression.

In accordance with the temporal compression of the present embodiment, the following sequence of frames illustrates that the average frame is not missing any motion information:

| Time 1 | Frame 1 + 2 | object moving between points A and B and C |
| Time 2 | Frame 1 + 2 | object moving between points A and B and C |
| Time 3 | Frame 3 + 4 | object moving between points C and D and E |
| Time 4 | Frame 3 + 4 | object moving between points C and D and E |

By decoding only to the average frame, half the frame rate can be presented without the stuttering appearance that results from skipping every other frame. The appearance to the user is the same as longer shutter time (exposure) during the video camera's acquisition of the image. This technique is particularly useful for processing 720p HD content which commonly has 60 frames per second because the 30 frame per second preview is nearly indistinguishable from the full frame rate. Prior techniques for motion compression (e.g., motion estimation) cannot generate an average motion frame without substantially increasing processing requirements.

As described further herein, temporal compression of four adjacent frames may be undertaken to generate data components that are decodable to produce a one quarter frame rate representation of the content of the source video, while maintaining all of the motion information.

It should be recognized that the temporal compression techniques of the present embodiment are unlike the motion estimation processes contemplated by the MPEG standards, which require non-symmetric CODECS and significant processing resources. Specifically, many of the exemplary encoding techniques of the present invention allow video to be encoded at a much faster rate than MPEG standards because the wavelet temporal compression described herein is substantially less CPU intensive than the motion searching techniques involved with MPEG motion estimation. Additionally, the encoding rate of these exemplary encoding techniques of the present invention are more predictable than MPEG motion estimation encoding (which is proportional to the amount of motion in the source video) because the wavelet motion encoding time is substantially the same regardless of the amount of motion in the source video. As a consequence, many of the encoding techniques of the present invention allow encoding to be carried out in real time upon capture (e.g., within hand held consumer devices such as video cameras).

In accordance with the inventive encoding method described further herein, data components corresponding to the interim low-pass resolutions 502, 602 and frame rates 800 and data components corresponding to the high-pass sub-band images 504, 506, 508, 604, 606, 608, 802 are generated and stored so as to be selectively retrievable. For example, the data components corresponding to any of the interim resolutions 502, 602 and frame rates 800 are retrievable without having to decode data components corresponding to the high-pass images 504, 506, 508. In the exemplary embodiment, a high-definition frame of 1920×1080 pixels can be decoded to 960×540 pixels, as if that was its original resolution, at maximum efficiency, without any additional CPU overhead. All the data needed to completely reconstruct the smaller image is available, so no artifacts are introduced. Decoding 960×540 pixels takes as little as one quarter of the CPU load versus decoding the full 1920×1080 pixels. It should be recognized, however, that image redundancy that all compression techniques exploit is greater at higher resolutions than at lower resolutions (i.e., average color regions are more common than sharp edges). As a consequence, the actual amount of CPU load reduction achieved in practice will vary.

The techniques of spatial and temporal resolution scaling discussed above can be extended to encode a source video stream in a manner that is dependent upon one or more of the following factors: the resolution of the source video stream, the frame rate of the source video stream, constraints of available system resources, user preferences, or the desired dynamic control of the editing or presentation applications used to process the encoded video stream. Specifically, in accordance with several embodiments of the present invention, the type of compression (e.g., horizontal, vertical and/or temporal) and the order in which the different types of compression are carried out are tailored as a function of the factors set forth above to generate storable data components that are decodable to several resolutions that are appropriate for a range of potential operating environments (e.g., system resources, and types of previews). In other words, encoding may be tailored such that the resulting data components are suited to the one or more of the above-identified factors. Encoding in this manor allows decisions about what the final presentation resolution will be to be delayed until the data components are decoded. Additionally, these decisions may be made on a on a frame-by-frame basis while decoding.

In the context of video editing, for example, most editing operations rarely need all the pixels presented to provide a user with a practical (i.e., sufficient quality) preview of the video undergoing the editing. Examples of these operations include scene selection, color correction, timeline playback, transition timing, clip length trimming, etc. Various high resolution video formats such 720p, 1080i, cinema 2k and 4k, all have different final output resolutions, yet the user typically has a workspace preview window that is the same size for all input formats. A preview window within the user's workspace typically will use only about one third of the desktop resolution. By taking this likely preview resolution into account, the encoding process can be altered to achieve very high quality decodes that are optimized (e.g., for speed and image quality) to target the preview resolution. The following table provides information about common video formats along with potentially viable reduced resolutions and/or frame rates for previewing edit results.

| Input format | Source resolution | Source frame rate | Suitable preview resolution | Suitable preview frame rate |
|---|---|---|---|---|
| HD 720p | 1280 × 720 | 60 | 640 × 360 | 60 and 30 and 15 |
| HD 1080i | 1920 × 1080 | 30 | 480 × 270 and 960 × 540 | 30 and 15 |
| Cinema 2k | 2048 × 1556 | 24 | 512 × 389 and 1024 × 778 | 24 and 12 |
| Cinema 4k | 4096 × 3112 | 24 | 512 × 389 and 1024 × 778 or 2048 × 1556 | 24 and 12 |

Although particular video resolutions are presented as being "suitable," it should be recognized that the suitability of a resolution depends on the application of the video. For editing, some users may find a resolution (e.g., the 480×270 or 512×389 resolutions) too low for their purposes, but a higher resolution (e.g., 960×540 or 1024×778) is likely sufficient resolution for 99% of most user applications. For other video playback tasks such as network video retrieval and scene selection, however, lower resolution previews (e.g., the 480×270 or 512×389 resolutions) will provide sufficient image quality.

In addition, the suitability of frame rates for a particular application depends on the video system. For editing systems, frame rates below 24 may be unsuitable because the motion is not smooth enough, but lower frames rates such as 12 or 15 fps (commonly used for web distribution) are likely suitable for browsing systems and scene selection.

It should also be recognized that the halved decoding resolutions in the preceding table are exemplary only, and that other resolutions including. $\frac{1}{3}^{rd}$ or $\frac{3}{5}^{th}$ resolutions may be encoded for subsequent decoding. Moreover, the encoded resolutions need not be symmetric with respect to the horizontal and vertical resolution reductions. For example, a simple alteration to encoding and decoding stages described further herein would allow for non-symmetric previews such as 480×540 from 1080i or 1024×389 from Cinema 2k. These output resolutions allow for more subtle controls over image fidelity without the trade-off of performance loss that is incurred when decoding fully to the next available higher resolution.

Figure 9A:
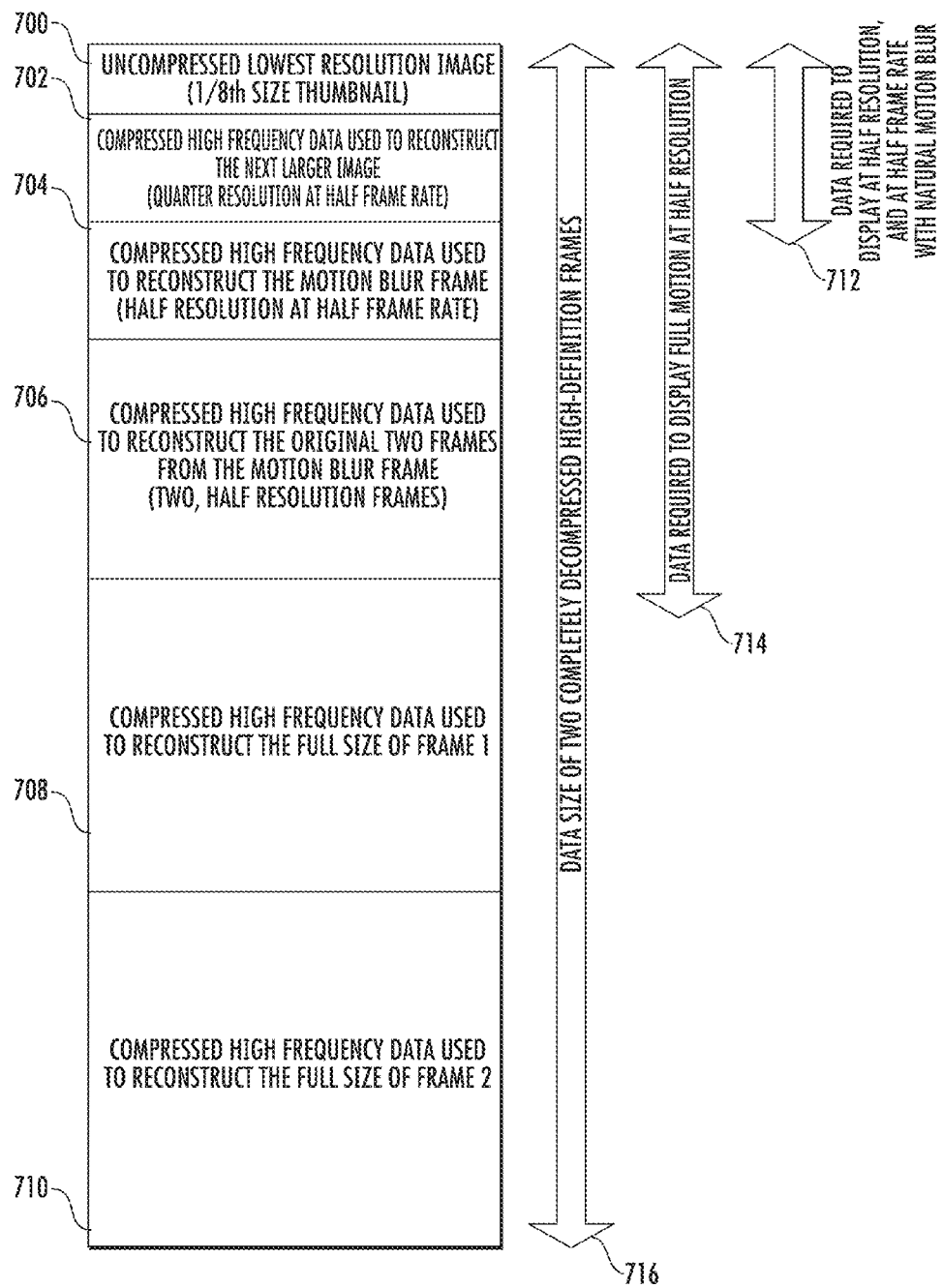
FIGS. 9A-9C shows illustratively how compressed video data is stored to enable selective data retrieval for display at various resolutions and frame rates.
Figure 9B:
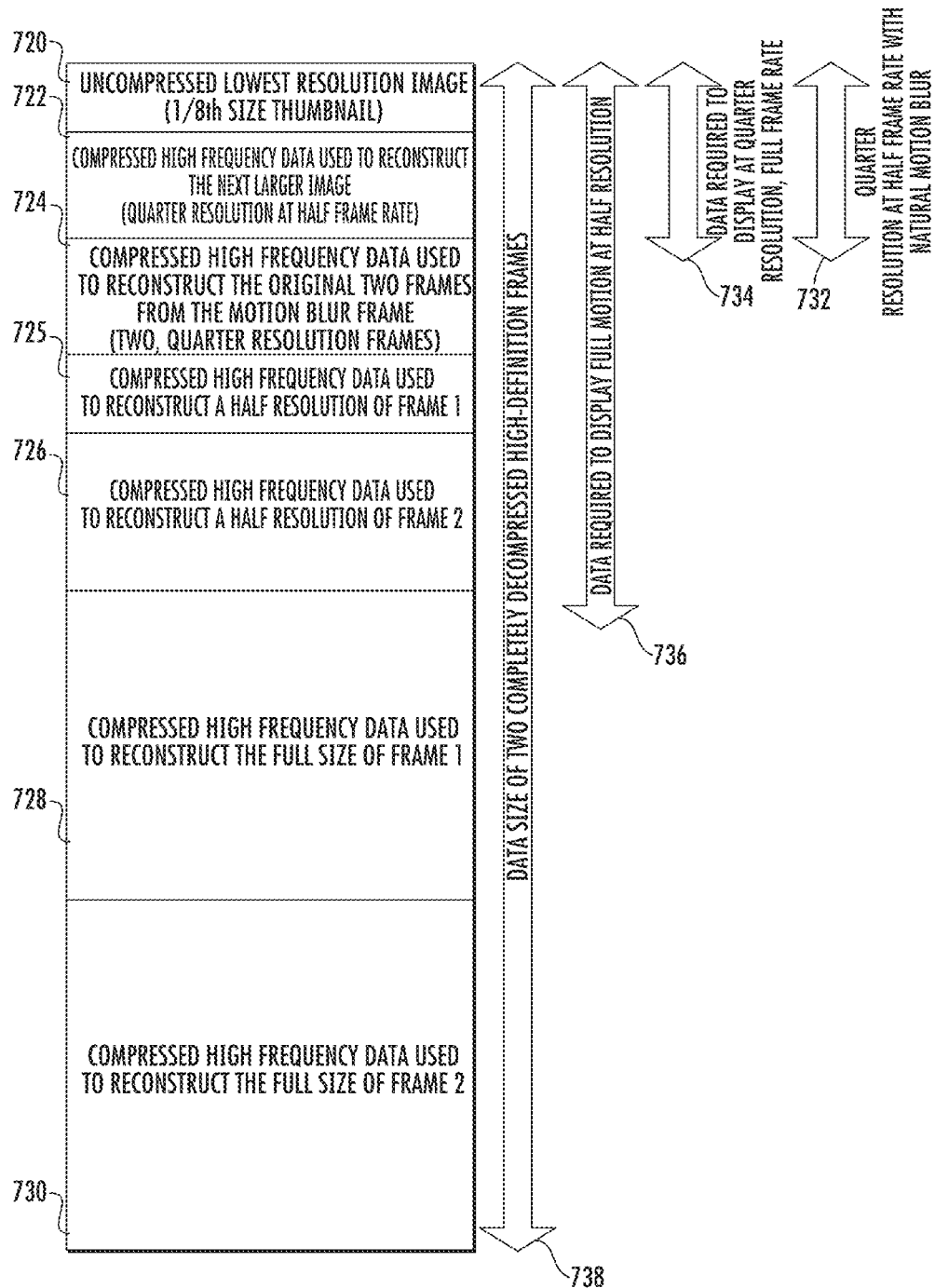
Figure 9C:
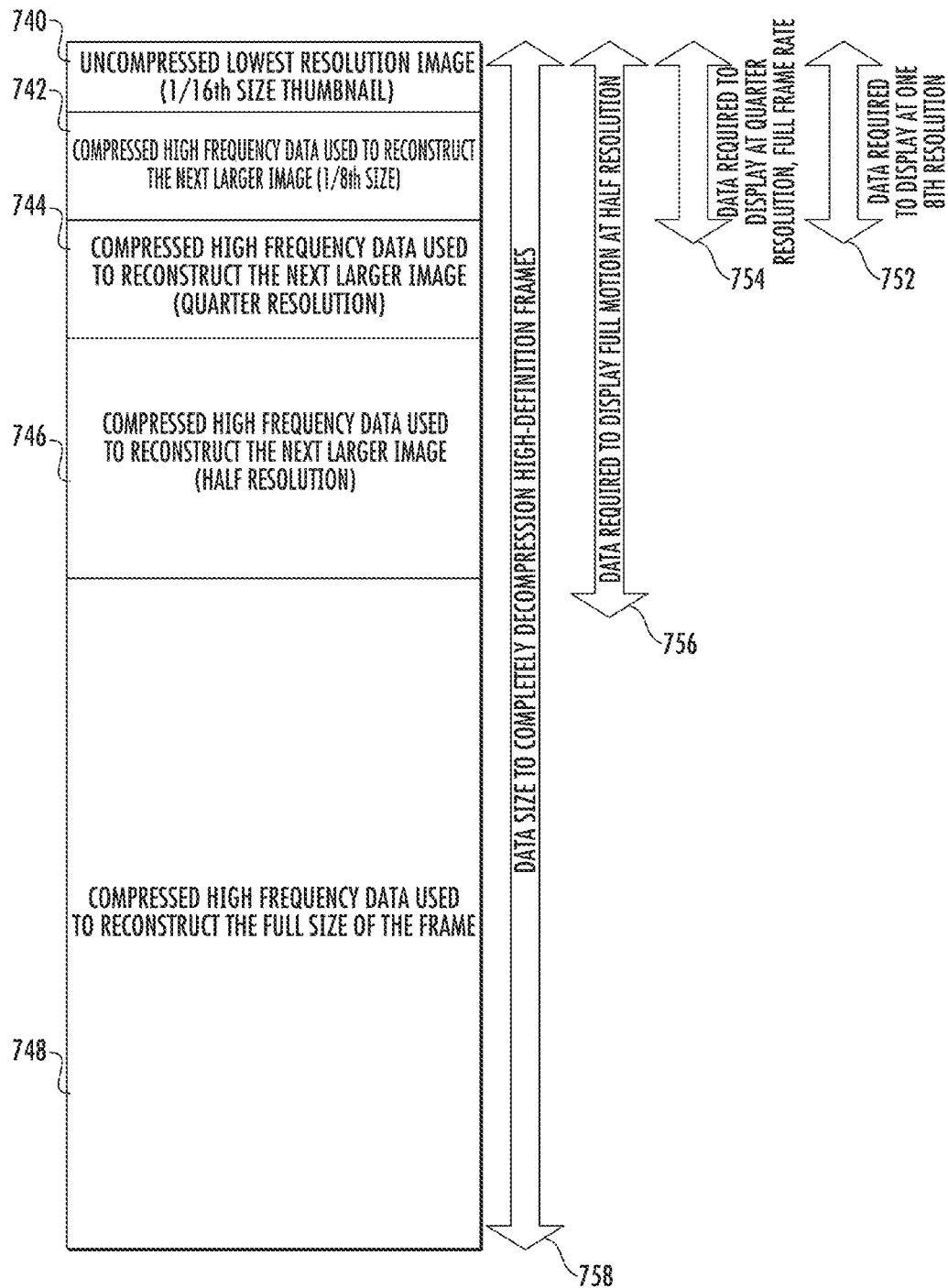

Referring to FIGS. 9A, 9B and 9C shown are three exemplary embodiments of an inventive video frame storage structure. As shown, each of the exemplary video frame storage structures includes a collection of data components, which are selectively decodable to generate desired video resolutions and/or frame rates. It should be recognized that the data components represented in FIGS. 9A through 9C are composed of color components (e.g., R, G, B or Y, U, V) that may interleaved or juxtaposed within each data component as discussed further herein. It should be recognized that the exemplary video frame storage structures of FIGS. 9A, 9B and 9C are just three of particular examples of the types of data components that may be generated by modulating the type and order of wavelet compression carried out during encoding to suit the type of source video.

Referring first to FIG. 9A, shown is a collection of data components 716 arranged in an exemplary video frame storage structure that is the result of two frames of video data (i.e., a two-frame GOP) being encoded using both spatial and temporal compression techniques. The collection of data components 716 in this embodiment comprises sufficient data to completely reconstruct the two frames of video content to their original resolution as well as selectively decodable data components 700, 702, 704, 706, 708, 710 to produce frames with lower resolutions and frame rates. The quantity of the data components and the content of each of the data components in the exemplary data structure are particularly suited to presenting lower resolution video streams of an original 1280×720 source video stream at 60 fps, but the present data structure is certainly not limited to data components derived from any single resolution.

As shown, the collection of data components 716 includes a lowest resolution data component 700, which in the present embodiment is ⅛ the size of the original resolution. Assuming the source video stream is an HD 720p video stream (i.e., 1280×720), the lowest resolution data component 700 is selectively decodable to produce an image of 160×90 pixels, which is particularly suited for displaying a single thumbnail image of the two-frame GOP.

Also shown are compressed high frequency data components 702, 704, which in combination with the lowest resolution data component 700, include data 712 that is selectively decodable to provide a frame at half resolution and at half the frame rate with natural motion blur (i.e., 640×360 @ 30 fps based on an original HD 720p video stream).

When data component 706 is decoded along with data components 700, 702 and 704, sufficient data 714 is available to reconstruct the two original frames at half resolution (i.e., 640×360 @ 60 fps based on an original HD 720p video stream). As discussed, when the collection of data components 716 is decoded, the two originally encoded frames may be reconstructed to full resolution.

Referring next to FIG. 9B, shown is another collection of data components 738 arranged in another exemplary video frame storage structure that is the result of a two-frame GOP being encoded using both spatial and temporal compression techniques. As with the data components 716 of FIG. 9A, the collection of data components 738 in this embodiment includes data to completely reconstruct the two frames of video content to their original resolution as well as selectively decodable data components 720, 722, 724, 725, 726, 728, 730 to produce frames with lower resolutions and frame rates. The quantity of the data components and the content of each of the data components in the present data structure is particularly suited to presenting lower resolution video streams of an original HD 1080i data stream with a resolution of 1920×1080 pixels at 30 fps, but other full resolution streams may be encoded in this manner as well.

As shown, the collection of data components 738 includes a lowest resolution data component 720, which in the present embodiment is ⅛ the size of the original resolution. Assuming the source video stream is an HD 1080i video stream (i.e., 1920×1080 pixels), the lowest resolution data component 720 is selectively decodable to produce an image of 240×135 pixels, which is particularly suited for displaying a single thumbnail image of the source two-frame GOP.

Also shown is a compressed high frequency data component 722 which in combination with the lowest resolution data component 720, includes data 732 that is selectively decodable to provide a frame at a quarter the resolution of the original source frames and half the frame rate with natural motion blur (e.g., 480×270 @ 15 fps based on an original HD 1080i video stream).

When data component 724 is decoded along with data components 722 and 720, sufficient data 734 is available to reconstruct the two original frames at a quarter of the resolution of the original frames (e.g., 480×270 @ 30 fps based on an original HD 1080i video stream).

As shown, when data components 726 and 725 are selected and decoded along with data components 724, 722 and 720, sufficient data 736 is available to reconstruct the original two frames at half the resolution of the original source frames (e.g., 960×540 @fps based on an original HD 1080i video stream).

Referring next to FIG. 9C, shown is yet another collection of data components 758 arranged in yet another exemplary video frame storage structure that is the result of a single frame of video data being encoded using spatial compression techniques. In the data structure of the present embodiment, the collection of data components 758 includes data to completely reconstruct the original source frame to its original resolution as well as selectively decodable data components 740, 742, 744, 746, 748 to produce frames with lower resolutions. The quantity of the data components and the content of each of the data components in the present data structure is particularly suited to presenting lower resolution video streams of an original Cinema 4k data stream with a resolution of 4096×3112 pixels at 24 fps, but the present data structure is certainly not limited to data components derived from any single resolution.

As shown, the collection of data components 758 includes a lowest resolution data component 740, which in the present embodiment is 1/16 the size of the original frame. Assuming the source video stream is a Cinema 4k video stream (i.e., 4096×3112), the lowest resolution data component 740 is selectively decodable to produce an image of 256×194 pixels, which is particularly suited for displaying a thumbnail image of the source frame.

Also shown is a compressed high frequency data component 742 which in combination with the lowest resolution data component 740, includes data 752 that is selectively decodable to provide a frame at an eighth of the resolution of the original source frame (e.g., 512×389 @ 24 fps based on an original Cinema 4k video stream).

When data component 744 is decoded along with data components 742 and 740, sufficient data 754 is available to reconstruct the original frames at a quarter of the resolution of the original frame (e.g., 1024×778 @ 24 fps based on an original Cinema 4k video stream).

As shown, when data component 746 is selected and decoded along with data components 744, 742 and 740, sufficient data is available to reconstruct the original frame at half the resolution of the original source frames (e.g., 2048×1556 @ 24 fps based on an original Cinema 4k video stream). When data component 748 is selected and decoded in addition to the other data components 746, 744, 742, 740 it is possible to reconstruct the original frame at the original resolution.

In the exemplary embodiments of FIGS. 9A-9C the full size of the compressed data 716, 738, 758 contains no more information than that needed to store a compressed representation of the full resolution, and all other image sizes and frames rates can be reconstructed during the decoding process. When image data is structured according to the exemplary embodiments of FIGS. 9A-9C, the minimum number of data components that need to be located in memory and decoded to produce a desired resolution is readily known. As a consequence, these data structures maximize decoding efficiency because only the data needed for the target resolution is read or decoded.

It should be recognized that the inventive data component file structure described herein is very different than "proxy files" which are used in other systems. Proxy files are typically reduced resolution versions of a video that are stored elsewhere from the full resolution version (e.g., on tape or in another file format). Although the proxy file technique enables fast previews, the proxy files that are previewed are typically a very low single resolution. In addition, the proxy file data is redundant to the full resolution data (i.e., the full resolution data does not include the proxy file). As a consequence, if the proxy file is anything but a very low resolution file, a lot of space must be allocated to store both the proxy file and the full resolution file.

Moreover, the proxy file typically is used in place of the full resolution file (i.e., both the proxy file and the full resolution file are typically not both readily available to the user/editor). As a consequence, operations such as color correction that must be applied to the full resolution cannot be easily carried out. Specifically, the workflow for proxy files is commonly referred to as "off-line editing," because the edit decision lists (EDLs) of cuts and dissolves are first made on the proxy, then the full resolution is captured (e.g., from tape) or brought into another system for on-lining.

In contrast, the data component structures according to the present invention contemplate storing not only a low-resolution thumbnail-type image but other intermediate resolutions and the full resolution image as well. Additionally, each of these resolutions are selectively decodable, which provides a significant amount of flexibility to the user/editor. Importantly, the data components that provide the various decodable resolutions are not redundant to one another. In addition, full resolution data in these embodiments, is on-line (i.e., the full resolution data available for editing). This simplifies the user's workflow because common operations that can't be described in the EDL, (e.g., color correction or layering video upon video for complex compositing) may be carried out without rendering. In other systems complex compositing typically requires rendering (the creation of a "flatten" file so that the results can be played). Rendering requires the source material (full-resolution) because some edits use the rendered results in other operations, and the rendered file becomes a new source, which has to be in full resolution.

Wavelet-Based Encoding for Selective Decoding

Figure 10A:
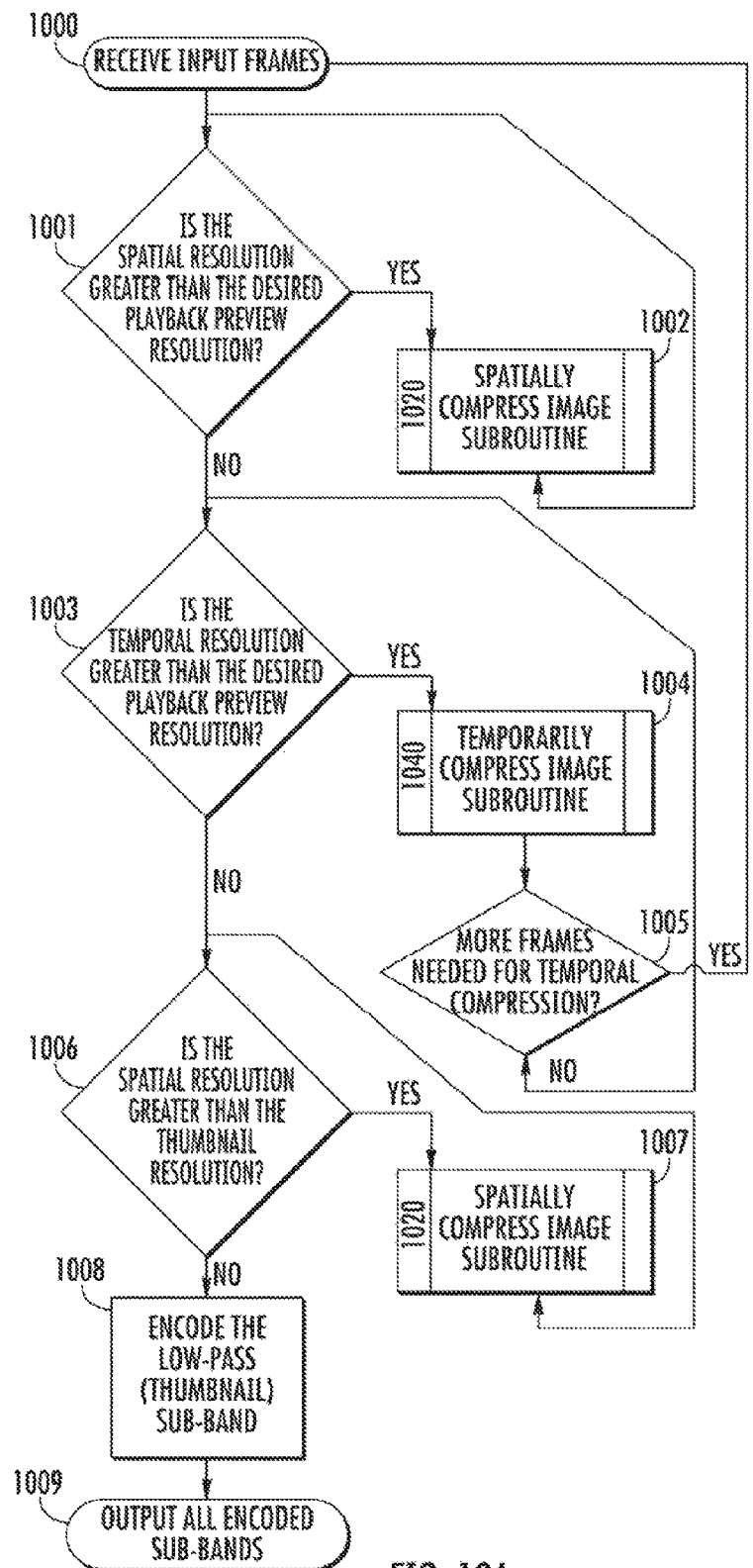
FIGS. 10A-10C are flow charts illustratively depicting steps carried out when encoding a video stream according to an exemplary embodiment of the present invention.
Figure 10B:
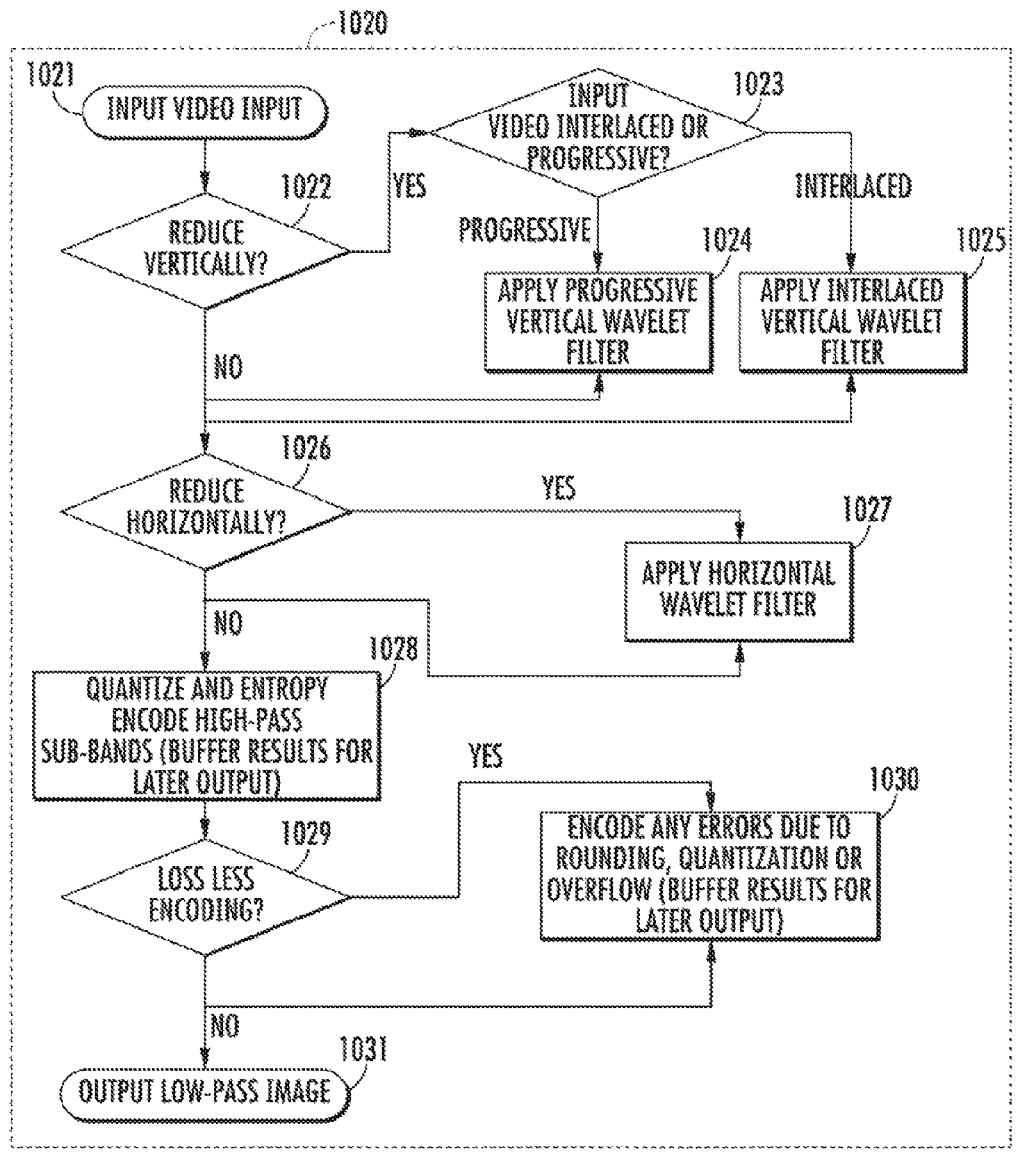
Figure 10C:
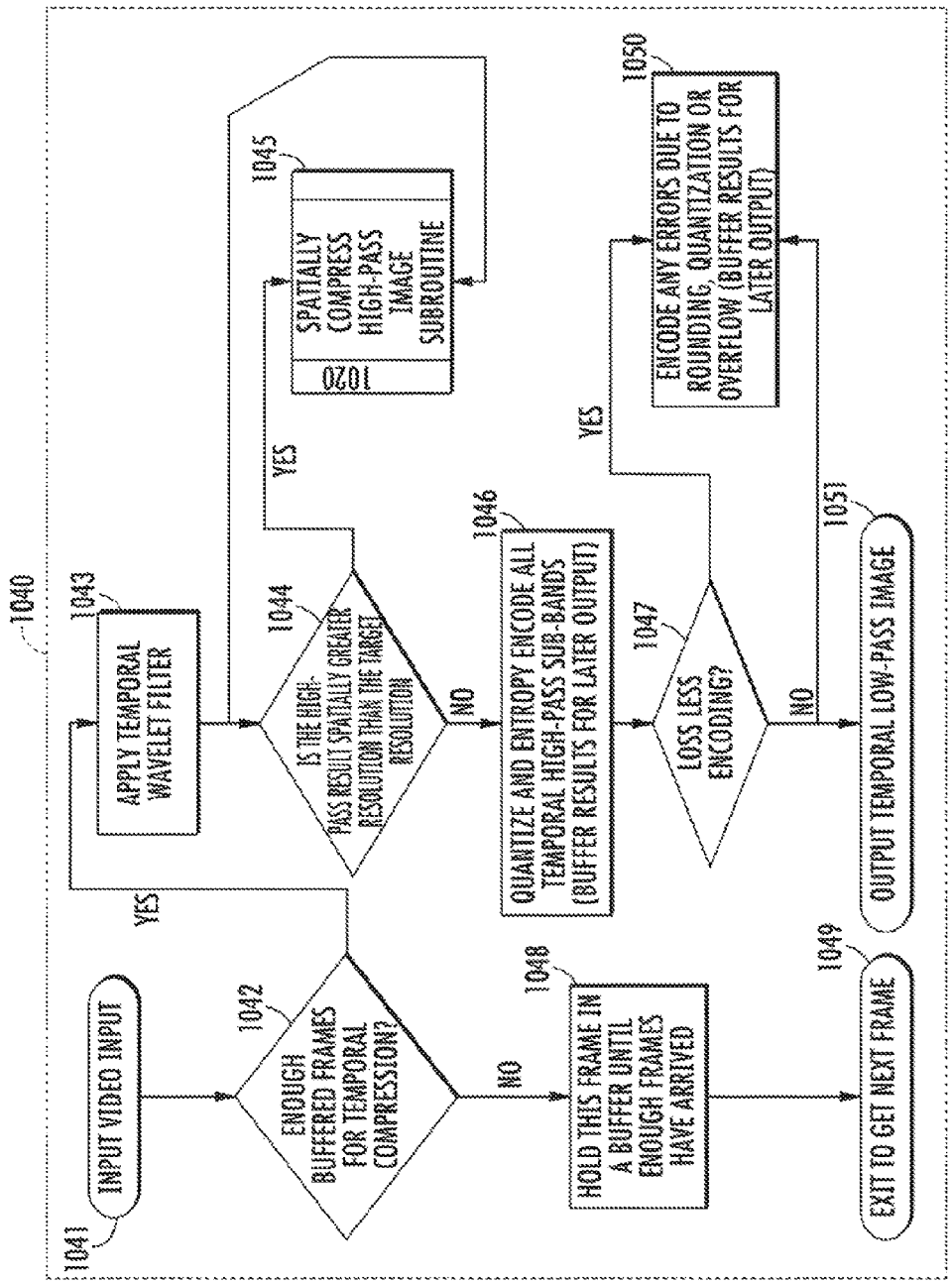

FIGS. 10A-10C illustrate a flow diagram depicting functional components of the CODEC 238 of FIG. 2 and one particular combination of steps it carries out when encoding a video stream color component by color component according to an exemplary embodiment of the present invention. Initially, a frame from a source video stream is received by the CODEC 238 (Step 1000), and if the resolution of the received frame is greater than the smallest target preview resolution (Step 1001), the frame is then sent to a spatial compressor 1020 for spatial compression (Step 1002). This target preview resolution may be requested by the end user or may be a default setting within a controlling application (e.g., the video editing program 232).

The frame sent to the spatial compressor 1020 is then vertically reduced and/or horizontally reduced depending upon the target resolution. As shown, if the image is vertically reduced (Step 1022), it is then determined if the frame, is interlaced (e.g., according to the 1080i standard) or is progressive (e.g., according to 720p and Cinema 2/4k standards) (Step 1023).

If the frame is from a progressive stream, a progressive vertical wavelet filter is applied (e.g. 2/6 or 5/3 wavelet) (Step 1024). If the frame is interlaced, a wavelet filter optimized for interlaced video is applied (e.g. HAAR 2/2 wavelet) (Step 1025). It should be recognized that only the first spatial transform is interlaced during encoding because the low-pass output 1031 will always result in a progressive image. If the frame is to undergo horizontal reduction (Step 1026), a horizontal wavelet filter is applied (Step 1027). After vertical and/or horizontal filtering a low-pass image that is reduced (e.g., halved) in resolution (e.g., horizontally and/or vertically) is output (Step 1031). The low-pass image, however, maintains a very high image quality because the wavelet filter produces an anti-aliased average of the original high-resolution image. It should be recognized that applying only one of either a vertical or horizontal reduction enables different non-symmetric preview modes such as 480×540 or 960×270 pixel presentations.

Also as a result of the wavelet filtering, three high-pass components are quantized and entropy encoded (Step 1028) and buffered to become part of the final encoded bit-stream 1009. When both horizontal and vertical filters are used, it doesn't matter whether horizontal or vertical transforms are performed first because the same output results. As shown, the spatial compression is repeated (Steps 1001,1002) until the resolution if the low-pass image that is output (Step 1031) reaches the size of the target preview resolution.

If lossless encoding (Step 1029) is applied, any data that would be lost due to quantizing, or mathematical errors such as rounding and overflows, is encoded (Step 1030) and stored as a new data component as part of the output stream (Step 1009) to allow for perfect reconstruction. The lossless encoding stage could be optionally performed before quantization (Step 1028). One technique includes preserving all the least significant bits that are lost via quantization as a new data component. This technique works well for encoding data with increased precision such as 10 bit or 12 bit input data, which is more likely to overflow 16-bit math that is used for greater performance (as compared to 32-bit math). Yet another lossless technique includes skipping the quantization and only performing entropy encoding (Step 1028). Using either technique, any errors are stored (Step 1030) as a new data component to be use in the decoder for optional perfect reconstruction.

If the temporal resolution is to be reduced (e.g., to provide a frame suitable for previewing, or to simply reduce the bit rate of a resultant stream)(Step 1003), then temporal compression is applied to two or more frames of the source stream (Step 1004). As previously discussed, temporal compression combines multiple frames into average frames (low-pass) and difference frames (high-pass), so the CODEC 238 must first check to see if enough frames have been buffered (Step 1042). If too few frames have been buffered, the current frame is stored (Step 1048), and the temporal compression process is stopped (Step 1049) until another frame is available. In the case where the temporal compression is reduced more than once, frames are buffered so that multiple (e.g., four or more) frames are averaged into one.

If enough frames have been received to carry out temporal compression, a temporal wavelet filter is applied to produce a high-pass (motion difference) and a low-pass (average) image (Step 1043). The low-pass image is then sent (Step 1051) to the next processing stage for further temporal compression (Steps 1003,1004,1005) or more spatial compression (Steps 1006,1007) if necessary. The additional spatial compression allows for greater bit-rate reduction of the resulting compressed video data, yet it also simplifies the generation of a thumbnail size image that is commonly used in scene selection tools, and marks a timeline with pictures of the in and out frames. It should be recognized that this thumbnail is part of the final compressed stream and is not an added image component like those used in the headers of JPEG files made by digital cameras. The low-pass (e.g., thumbnail-size) image 1008 and all the high-pass components are output 1009 to complete the compression of the video group of pictures (GOP).

Applying the present steps to a video frame with 720p resolution, the resulting data components are decodable to preview modes of 640×360 at 60, 30 and 15 frames per second (fps). By performing the temporal stage first, a preview resolution of 1280×720 at 30 fps would be available. Similarly, when the current steps are applied to a Cinema 4k compliant stream, data components are generated that are selectively decodable to provide preview modes of 2048×556 at 24 fps; 1024×778 at 24 fps; and 512×389 at 24 and 12 fps.

It should be recognized that the temporal 1004 and spatial compression stages 1002, 1007 can be reversed in order, or mixed so that after a spatial compression stage (carrying out vertical and/or horizontal compression), a temporal compression stage is invoked, which is then followed by another spatial compression stage. In this way, the variety of available decodable resolutions is increased. For example, by performing the temporal compression step 1004 to occur earlier in the image reduction stages (e.g., before one or more of the spatial compression steps 1002), data components may be generated that allow preview resolutions with frame rates of 2048×1556 at 24 fps; 1024×778 at 24 or 12 fps and 512×389 at 12 fps. Moreover, different combinations of spatial compression may be used to generate data components for different resolutions. For example, a frame may be horizontally compressed twice before carrying out vertical compression.

Figure 11:
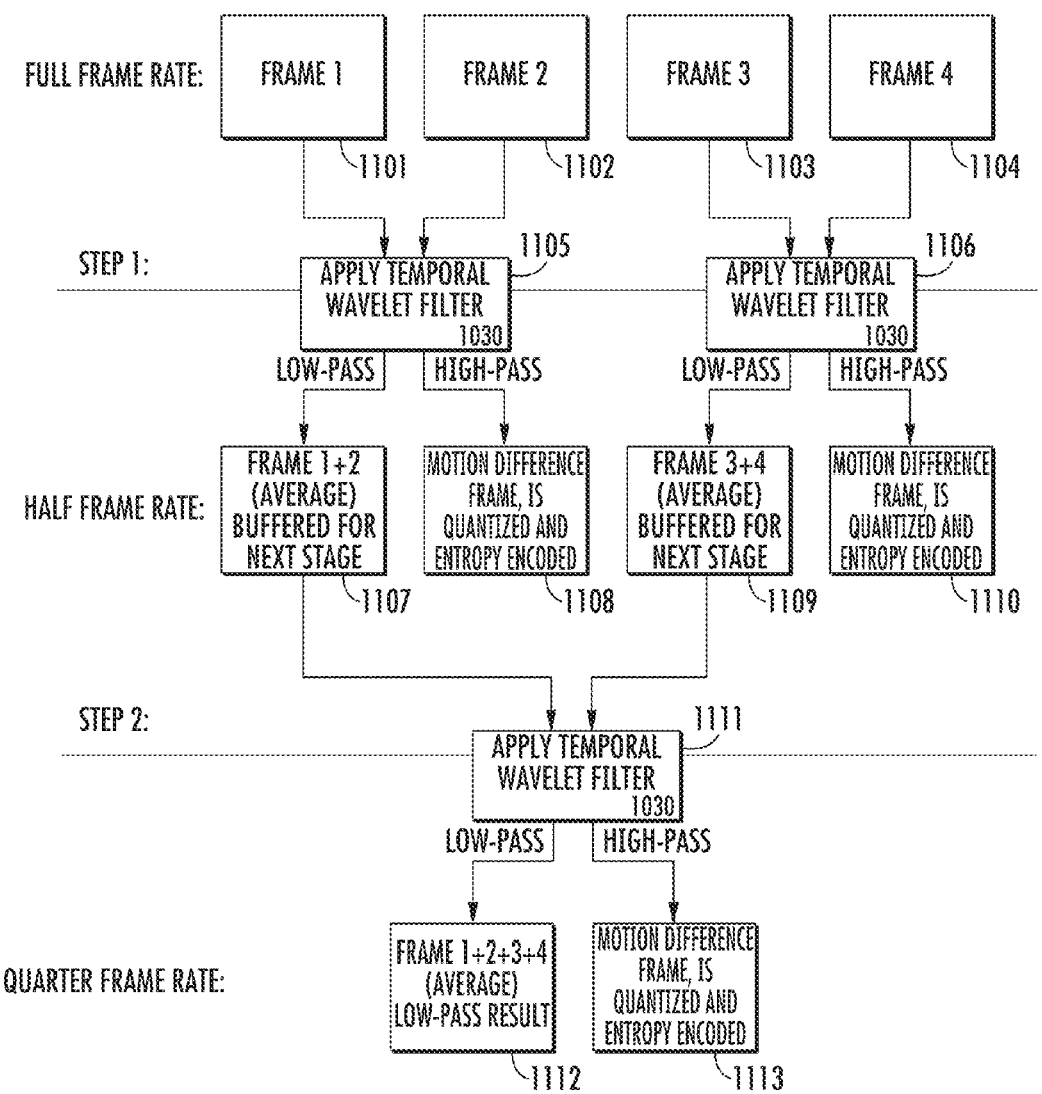
FIG. 11 is a data flow diagram illustratively depicting a way in which four adjacent video streams are temporarily compressed into a sum frame containing motion blur and a high frequency difference frame.

Referring next to FIG. 11, shown is a flow diagram depicting steps carried out during temporal compression of four frames of source video into one motion average frame. As shown in FIG. 11, a first frame 1101 and a second frame 1102 are compressed (Step 1105) to generate a first average frame 1107 and a first motion difference frame 1108. The first average frame 1107 is computed as discussed with reference to FIGS. 7 and 8 (by summing pixels from each source frame) so that the result looks like natural motion blur (e.g., average frame 800). The motion difference frame 1108 contains all the information necessary to convert the first average frame 1107 back into the two separate source frames 1101, 1102.

If more temporal compression is requested (for smaller data files or more preview options) the same process performed on the first and second frames 1101, 1102 is repeated for the third and fourth frames 1103, 1104. The resulting second average frame 1109 (of the third and fourth frames) is then temporally compressed with the first average frame 1107 (of the first and second frames 1101, 1102) to generate a final motion average frame 1112. The final motion average frame 1112 contains all the motion blur from the first frame 1101 to the last frame 1104. This technique can be applied to more than four source frames by repeating the methodology described with reference to FIG. 11, however, compression advantages will diminish with larger GOP lengths. This style of temporal compression is typically selected for its coding speed and preview characteristics rather than its compression size.

Although the spatial and temporal compression described with reference to FIGS. 10A-10C and 11 may be carried out on a video stream in any color format, YUV format is often preferred over RGB format because it may be compressed more without affecting image quality. Specifically, YUV format better matches the human visual system, which is more sensitive to brightness (Y) than color information (U and V). As a consequence, more compression can be applied to the U and V components without greatly affecting image quality.

Figure 12:
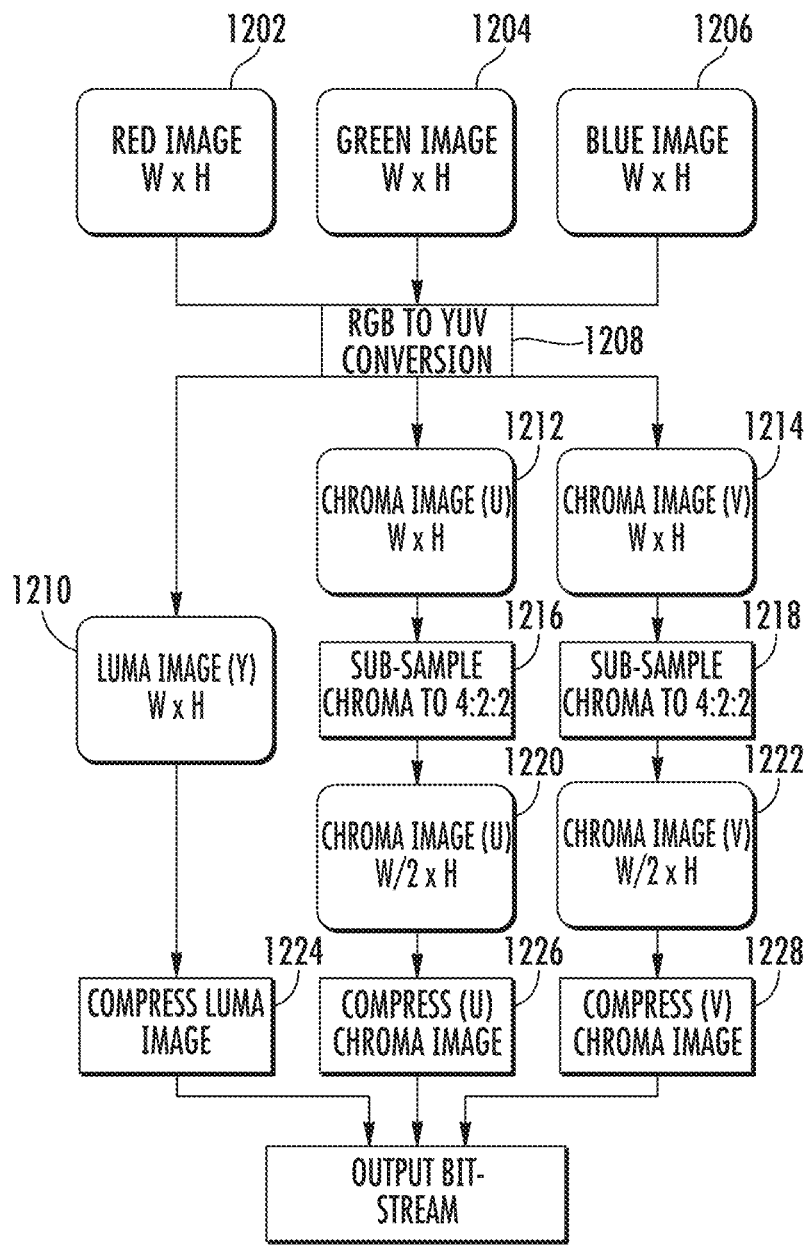
FIG. 12 is a data flow diagram illustratively depicting a way in which red, green and blue data components are converted into Y, U and V data components before encoding according to one embodiment.

Referring next to FIG. 12, shown is a flow diagram depicting steps carried out to convert from red, green, blue (RGB) format to a compressed YUV format prior to the spatial and/or temporal compression described with reference to FIGS. 10A-10C.

As shown in FIG. 12, red, green and blue components 1202, 1204, 1206 are converted to YUV components 1210, 1212, 1214 according to well-known techniques (Step 1208). The U and V chroma components are then sub-sampled (e.g., according to 4:2:2, sub-sampling) as is known in the art to generate reduced resolution U and V color components 1220, 1222 (e.g., half width U and V components)(Steps 1216, 1218). Other color sub-sampling techniques could also be applied, such as 4:2:0 and 4:1:1, or no color sub-sampling using 4:4:4. The full size Y component 1210 and the reduced resolution U and V color components 1220, 1222 are then spatially and/or temporally compressed as individual component images as described with reference to FIGS. 10A-10C and 11 (Steps 1224, 1226, 1228) to generate a compressed video stream.

Although FIG. 12 depicts processing on YUV components after RGB source data is converted to YUV components, the spatial and temporal compression techniques described herein can be applied for any type of color system, by either natively encoding the data in its input format (storing RGB as compressed RGB), or converting to another colorspace.

The data components that result from the encoding stage may be placed within a file in any order. In one possible structure, the file contains all the high pass information first, followed by the lower resolution data components; this is the order that naturally flows from the encoding steps which reduce the frame from full size down to a thumbnail size. During decoding, however, the decoder first accesses the data component that includes data for the lowest resolution image and then reconstructs the image by adding data components in order of increasing size. As a consequence, in another structure, the data components are organized to help optimize the decoding process. Specifically, the data component that generates a thumbnail image is positioned in the file so it is accessed first during decoding, and then the higher resolution data components are positioned after the thumbnail data component so that the data components are positioned (and accessed during decoding) from lowest resolution to the highest resolution. It should be recognized, however, that the ordering of the data components and their physical locations may vary without departing from the scope of the invention.

In addition to data components for increasing image size, there are data components for each of the color channels (i.e. YUV or RGB, etc). Referring next to FIGS. 13A-D for example, shown are color components within various video frame storage configurations according to exemplary embodiments of the present invention. Referring first to FIG.

13A, shown is a storage configuration in which the encoded data components are organized according to color components. As shown, the compressed data components in the present embodiment are organized into a compressed luma component 1302, a compressed U chroma component 1304 and a compressed V chroma component 1306. Also shown is a GOP header 1308 which contains information including the size of the image data being compressed (e.g., 1280×720 or 1920×1080 etc.), the type and number of color components (RGB, YUV, CMYK, etc.) and pointers to where each color component's data starts. The pointers enable the decoder to efficiently bypass data not needed to decode to the target preview resolution.

Figure 13A:
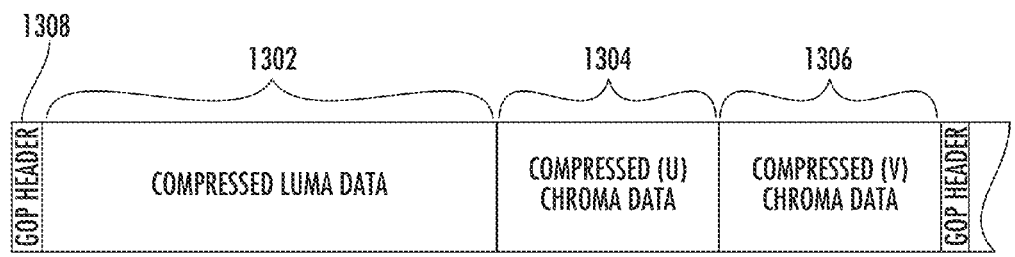
FIGS. 13A-13D illustratively shows how compressed color video data components are stored to enable selective data retrieval for display at various resolutions and frame rates.
Figure 13B:
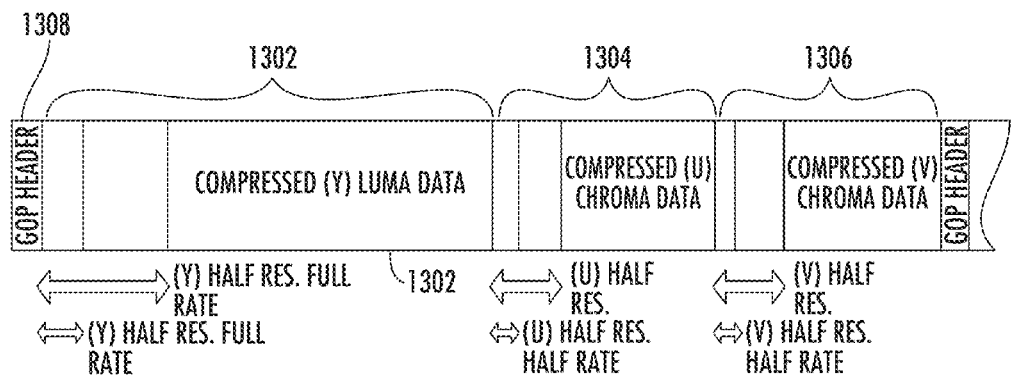

FIG. 13B is a detailed view of the data components of FIG. 13A showing where data for each of the preview resolutions are stored. As shown, each of the compressed color components 1302, 1304, 1306 in this embodiment includes data for the various resolutions generated during the encoding process. It should be recognized that FIGS. 13A and 13B are only exemplary and that there are many options for ordering of the data components for different resolutions and color channels.

When accessing particular data components (e.g., when previewing edits at a lower resolution than the original source resolution) it is advantageous to skip the data components that are not accessed, and hence, it is advantageous to know during decoding where the particular data components that are being accessed are within each GOP. As a consequence, in accordance with several embodiments of the present invention, an index of pointers, which identifies the locations of data components, is stored within the GOP header 1308. In this way, it is possible to skip over unneeded data components, and potentially not even read them from their location of storage (e.g., from a disk). Because the index allows data components to be directly fetched no matter where they are stored, the ordering of the data component can be simplified.

In some embodiments, the index also includes pointers to data components stored within another file or in multiple files. In the structure shown in FIGS. 13A and 13B, where all the luma components are stored followed with all the chroma components, the index allows the largest data components of luma to be bypassed when requesting the first chroma component. If the color components were interleaved (not shown) in increasing size, however, the index allows only the components needed to be fetched from disk in one continuous block. Without such an index, it would be difficult if not impossible to selectively access and decode particular data components regardless of whether the data is structured as shown in FIGS. 13A and 13B or interleaved. Instead, all the data would need to be read (e.g., from disk) and parsed to find the relevant components; thus the index is very useful for increasing the decoding performance.

The index enables data component retrieval for tasks other than that of human visual preview. Although fetching and decoding a particular subset of data components may be carried out in connection with a fast high quality visual preview for humans as described herein, fetching and decoding other subsets of data components will also result in similar performance gains for different applications. Image searching, pattern recognition and biometric analysis, for example, can all be performed using fewer data components than would be adequate for human preview. These automated image analysis techniques may need to only process luma data (monochrome images) at lower resolutions for searching through large volumes of video information at the highest possible rate. Some techniques may decode only the motion difference high-pass sub-bands 802 to accelerate the search for a particular movement with a video sequence. Advanced object recognition may fetch and decode only a few of the high-pass sub-bands (e.g., 504, 508, 604, 606, etc.) as these contain data very suitable for edge detection algorithms. In short, many embodiments of the present invention (e.g., those that incorporate an index to the data components) provide an enormous amount of flexibility for humans or machines to decode in ways which may not, or cannot, be known when encoding the source data.

Figure 13C:
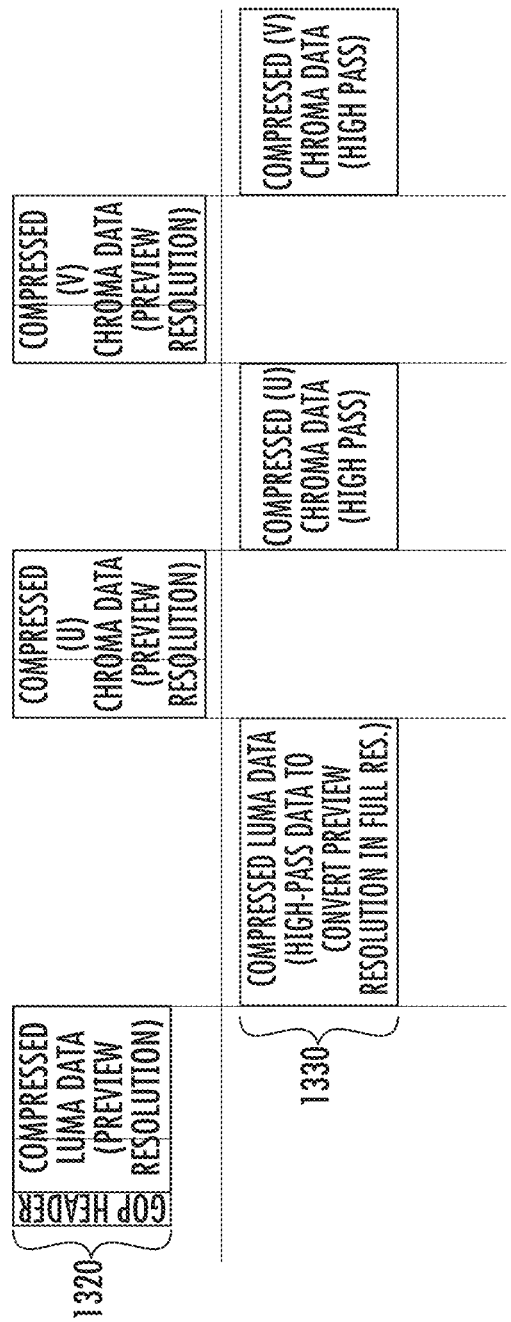

Referring next to FIG. 13C, shown is another embodiment of the inventive video data storage configuration illustrating the severability of the data components for selective decoding. As shown, data components which are decodable to provide a half resolution frame 1320 are separated from the other full resolution data components 1330 that are necessary to reconstruct a full resolution frame. The full resolution data components 1330 can be completely bypassed for a half resolution preview decode. When stored on a disk device the full resolution data components 1330 can be simply skipped using a disk seek or similar technique.

Figure 13D:
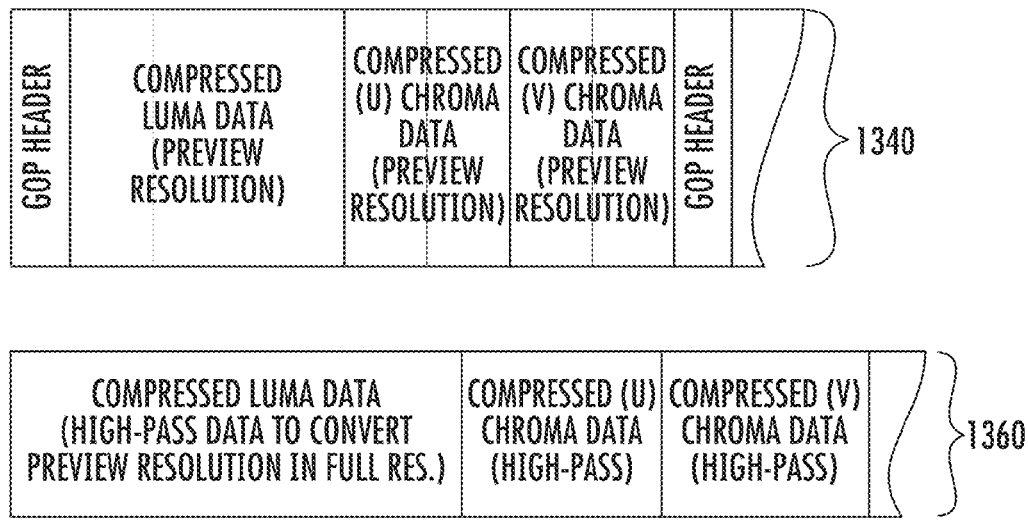

FIG. 13D shows an exemplarily embodiment of the inventive selectively decodable data structure which is efficient for decoding from disk storage media (e.g., magnetic or optical storage media), and hence, is efficient for previewing and editing. In the exemplary embodiment, preview data components 1340 and full definition data components 1360 are stored into separate outputs or files. The separate files can easily be stored on different disks or even on separate systems. Playback of the preview data can then be performed without the storage device (e.g., disk drive) having to search for the data, resulting in even higher performance by reducing the disk demands. It should be recognized that it is possible to break the data components up into even smaller segments so that there are separate files for each of the various preview resolutions. For example, files of a thumbnail resolution may be stored separately from higher resolution data components to provide a high degree of browsing and search performance.

It should be recognized that the sub-image data components are by no means limited to the exemplary structures described shown in FIGS. 13A-13D. For example, another viable structure for encoding and decoding includes color components that are interleaved so that all the color data for each preview resolution is adjacent. In such a structure, upon decoding all lowest resolution color data components (e.g., R, G, B thumbnails) are passed in the bit-stream before data components of the next higher preview resolution are added In the case of network delivery of the compressed video data, only components required for the requested preview resolution need to be transmitted—greatly reducing network loads. For example, if a remote user desires to preview a selection of video content, lower resolution data components may be sent to the user for the user to preview. It should be recognized that this network delivery technique is very different from bit plane progression techniques such as progressive JPEGs, which transmits compressed coefficients with increasing significance (i.e., more or most significant bits or components first). The image resulting from bit plane progression is the same resolution as the final target resolution (not lower), and is only an approximation of a blurry version of the image. Moreover, bit plane compression is not intended to reduce computation load (the full transforms are applied to the partial data).

The progressive nature of existing techniques, whether based on a bit-plane progressive or zero tree wavelet methodology (which is similar to bit-plane progressive techniques in the way that the methodology determines significance of bits to transmit), are designed to manipulate video bandwidth at the transmitter end for sending video or picture over a variable bandwidth limited network (e.g., a wireless and cellular video applications). None of these systems are designed to enhance processing performance, and typically these other systems increase decoder complexity, and as a consequence, are unsuited for video retrieval, browsing and editing applications. In addition, these systems are typically block-based systems, which divide the full image into smaller regions for individual compression. Block-based systems are poorly suited for decoding into many resolutions because each block must contain all the data for decoding to the full resolution, making it difficult, if not impossible, to bypass unneeded data because all blocks are required to generate a preview. Moreover, indexing would likely be unwieldy to implement because each block would have to be indexed, and there are often thousands of blocks per frame.

Figure 14:
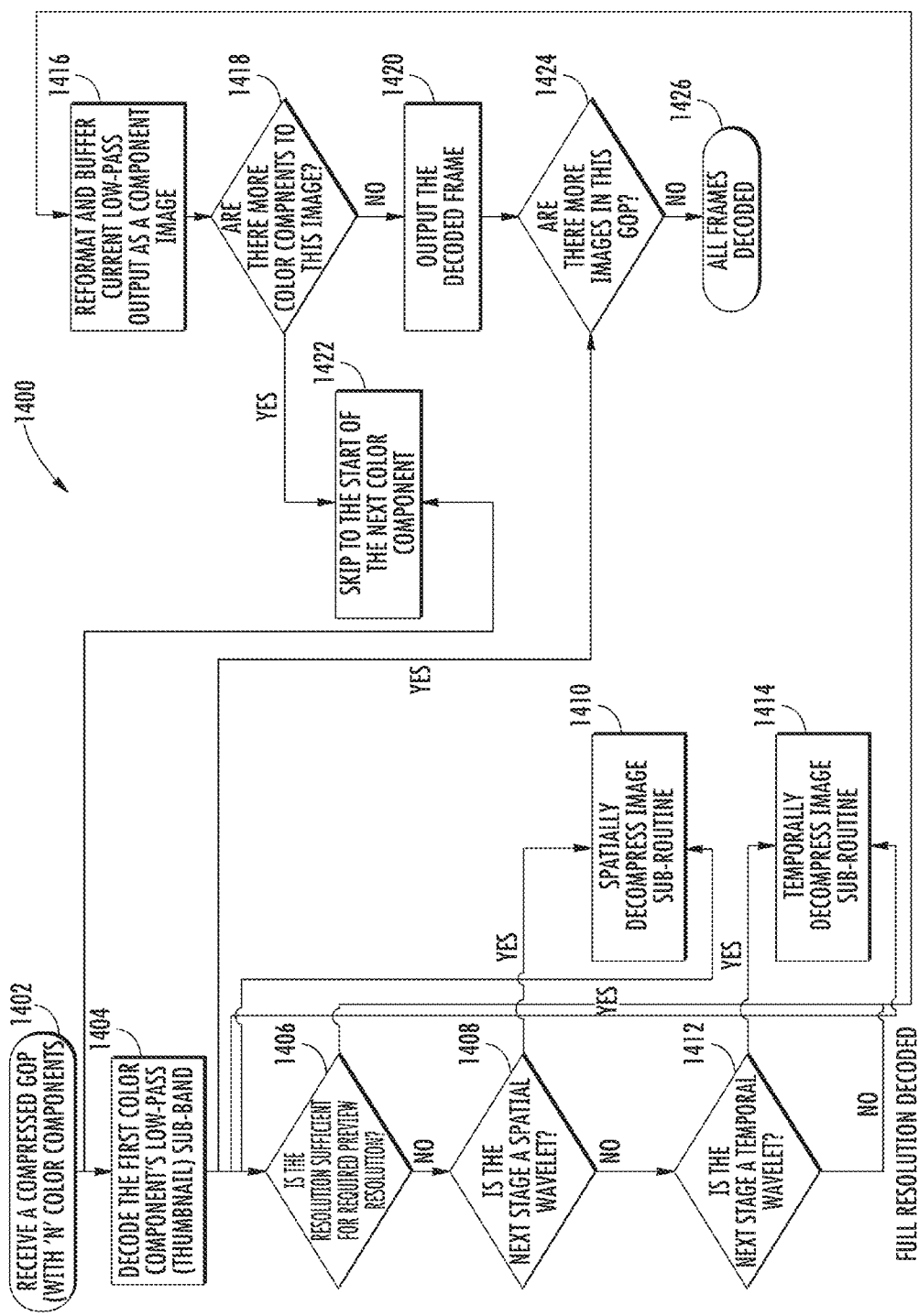
FIG. 14 is a flow chart illustrating steps carried out during selective decoding according to an exemplary embodiment.

Referring next to FIG. 14, shown is a flowchart illustrating exemplary steps carried out in accordance with the inventive selective decoding process. As shown, a compressed group or pictures (GOP) is input to a decompressor (e.g., the CODEC 238)(Step 1402). Initially a lowest resolution (sub-band) data component (e.g., thumbnail resolution data component) within the compressed GOP stream for a first color component is decoded (Step 1404). It should be noted that the Y component of a frame encoded in the YUV color space may be decoded alone to present a grey scale thumbnail representation of the image, which could be used for black and white thumbnail previews.

If the lowest resolution (e.g., thumbnail size) data component is all that is required to decode to provide a desired level of resolution (Step 1406), all further decoding of the current color component is bypassed 1416. The lower resolution data component for the first decoded color is then reformatted (if necessary) and buffered. The reformatting typically includes scaling the 16 bit (or similar) data to match the target output format such as 8 to 10 bits per color component so that is it suitable for display. If there are more color components (Step 1418), the remaining color components of the lowest resolution data component are retrieved (Step 1422), decoded (Step 1404), and assembled for output as a decoded frame (Step 1420). If there are more frames in the GOP (Step 1424), those are decoded from the bit-stream, but if there are no more frames, the GOP's decoding is complete (Step 1426).

The process for producing images at other preview sizes is similar to extracting a thumbnail. As shown in FIG. 14, after the lowest resolution data component (e.g., thumbnail resolution) is decoded (Step 1404), and more image resolution is desired/required (Step 1406), the next higher resolution data component within the bit stream of the GOP is tested to determine whether it is a spatially (Step 1408) or temporally (Step 1412) encoded. In either case, the data is decoded as appropriate by either spatial decompression (Step 1410), or temporal decompression (Step 1414). If the resulting higher resolution image (i.e., higher resolution spatially or temporally) does not match the required/desired resolution (Step 1406), Steps 1408, 1410, 1412, and 1414 are repeated until the preview size is reached or the full image is completely decoded. The resulting image is reformatted and buffered (Step 1416) until all the color components have been decoded (Step 1418). Once all the color components of the required/desired resolution are decoded, they are formed into an output frame (Step 1420). If additional compressed frames remain from the GOP (Step 1424), they are decoded in the same manner to complete the process (Step 1426). For improved performance in the implementation, the last wavelet sub-bands for each color component are decoded together so that the resulting image can be interleaved into common outputs (e.g., RGBRGB, YUYVYUYV, etc.).

Presently available editing systems typically do not handle dynamic frame size changes. In an exemplary embodiment, to accommodate these editing systems, an additional image-scaling step is carried out after decoding the image. Even when scaling is performed, CPU load is substantially reduced because the additional scaling step adds only a minor amount of additional processing compared to the processing decreased by selectively decoding to a lower resolution. As a consequence, an overall reduction in load is achieved while providing a smooth playback.

Altering the temporal resolution of the preview can also achieve the same result. A system then normally previews at 60 frames per second (e.g., 1280×720 at 60 fps running at 640×360 @ 60 fps) could dynamically reduce the CPU load further (as needed) by decoding to a lower frame rate (e.g., 640×360 pixels at 30 frames per second). A loaded CPU that can only decode and mix at 45 frames per second would stutter if it tried to decode at 60 fps (e.g., one or more frames would be skipped) resulting in a poor playback quality. Selectively decoding to a lower frame rate allows a system to significantly reduce (e.g., halve) its CPU load by decoding to a frame rate (e.g., 30 frames per second) that is below the 45 fps system maximum. Because temporally reduced previews include motion blur that is derived from each of the original frames, preview quality is substantially better than that of systems that simply drop one or more frames, which produces an unnatural and undesired strobing appearance.

By selectively decoding data components to a desired resolution according to the present invention, both frame-rate reduction and resolution reduction can be exploited simultaneously for up to a six times decrease in CPU load (for decoding), and an eight times decrease in processing load for downstream effects (i.e., the system load is reduced by only processing one eighth of the total pixels). In some embodiments, the choice of frame-rate reduction and/or resolution reduction can be made at any time during the editing process. In an exemplary embodiment, the editing mode can be selected manually through an option presented within the video editing application's user interface 100, or automatically by the video editing or processing application based upon a variety of runtime factors. For example, the automatic selection of the selected reduced-resolution video stream may be pre-selected within the video editing or processing application or calculated based on various runtime factors including the editing or other operations selected by the user/editor, the CPU resources, video image quality, video processing work load, video data capacity, the perception abilities of the user, the bandwidth of a transmission channel (e.g., within the network 120) or other factors. As previously discussed, the resolution of the data decoded may be varied dynamically depending upon these runtime factors. Decoded resolution could vary frame by frame Is needed. In this way, the user/editor is beneficially provided a higher resolution when their system is not heavily loaded and a lower resolution when the video quality would otherwise breakdown.

In the context of video editing, the performance increase will be directly experienced through a greater number of effects and mixes that can be performed in real-time. In some cases where very high resolution content is used, these techniques will result in a real-time editing experience, on a standard computer system, whereas real-time editing (or even single stream playback) would be otherwise impossible.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings.

For example, the CODEC 238 described with reference to FIG. 3 may be realized by software, hardware or a combination thereof. Moreover, the CODEC 238 is not limited to desktop computing environments. Specifically, the CODEC 238 or portions thereof (e.g., the encoder or decoder alone) may be implemented in a variety of consumer electronics devices that process video data.

The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A method for processing compressed video data, the method comprising:
    storing, in a storage structure, for each of a plurality of frames of video having a corresponding image at an original display resolution, a corresponding plurality of image components representative of the frame of video, the plurality of image components including a base image component associated with a given display resolution, and one or more additional image components associated with display resolutions greater than or equal to the given resolution and less than or equal to the original resolution, and the base image component comprising the corresponding image at the given display resolution;
    selecting, based at least on a first processing load of a decoder, a first display resolution at which to display a first of the plurality of frames of video;
    retrieving from the storage structure a first subset of the plurality of image components corresponding to the first frame of video, the first subset of image components selected based at least on the first display resolution and including the base image component corresponding to the first frame of video;
    decoding the retrieved first subset of image components to generate a first modified frame of video at the first display resolution, the first modified frame of video comprising the image corresponding to the first frame of video;
    based at least on a change in processing load of the decoder to a second processing load, selecting, based on the second processing load, a second display resolution at which to display a second frame of video;
    retrieving from the storage structure a second subset of the plurality of image components corresponding to the second frame of video, the second subset selected based at least on the second display resolution and including the base image component corresponding to the second frame of video; and
    decoding the retrieved second subset of image components to generate a second modified frame of video at the second display resolution, the second modified frame of video comprising the image corresponding to the second frame of video.

2. The method of claim 1, wherein:
    the retrieving the first subset of the plurality of image components corresponding to the first frame of video comprises retrieving image components corresponding to the first frame of video which are associated with a resolution equal to or less than the first display resolution; and
    the retrieving the second subset of the plurality of image components corresponding to the second frame of video comprises retrieving image components corresponding to the second frame of video which are associated with a resolution equal to or less than the second display resolution.

3. The method of claim 1, wherein the corresponding plurality of image components for each of the plurality of frames of video are stored in the storage structure consecutively and in ascending order of resolution, starting with the base image component.

4. The method of claim 3, wherein the retrieving the first subset of the plurality of image components corresponding to the first frame of video comprises:
    identifying one of said plurality of image components corresponding to the first frame of video associated with first selected display resolution; and
    retrieving from the storage structure in consecutive order, those of said plurality of image components corresponding to the first frame of video beginning with said base image component ending with the identified one of said plurality of image components.

5. The method of claim 1, wherein the storage structure additionally comprises an image component index storing at least the locations of the plurality of image components corresponding to the first frame of video in the storage structure, and wherein the retrieving of the first subset of the plurality of image components comprises:
    identifying one or more of the plurality of image components corresponding to the first frame of video with associated resolutions equal to or less than the first display resolution;
    identifying the one or more locations of the one or more identified plurality of image components in the storage structure using the using the image component index; and
    retrieving the one or more identified plurality of image components from the one or more identified locations in the storage structure.

6. The method of claim 1, wherein the first display resolution comprises the original resolution and the retrieved first subset of the plurality of image components comprises all of the image components corresponding to the first frame of video.

7. The method of claim 6, wherein the second display resolution comprises a resolution less than the original resolution but greater than the given resolution, and the retrieved second subset of the plurality of image components comprises less than all of the image components corresponding to the second frame of video.

8. A system for processing compressed video data, the system comprising:

a memory configured to store, in a storage structure, for each of a plurality of frames of video, a corresponding plurality of image components representative of the frame of video, the frame of video comprising a corresponding image at an original resolution, the plurality of image components including a base image component comprising the corresponding image at a base resolution and one or more additional image components associated with resolutions greater than or equal to the base resolution and less than or equal to the original resolution;

a decoder in data communication with at least the memory and configured to, for each of the plurality of frames of video, decode a retrieved subset of the plurality of image components corresponding to the frame of video to generate a corresponding modified frame of video, the corresponding modified frame of video comprising the image corresponding to the frame of video at a selected display resolution;

a resolution selection apparatus in data communication with at least the decoder and configured to:

select a first display resolution at which to display a first of said plurality of frames of video, the selection based at least on a first processing load of the decoder; and in response to a change in processing load of the decoder to a second processing load, select a second display resolution, the second display resolution selected based at least on the second processing load; and a data component apparatus in data communication with at least the memory and configured to:

retrieve a first subset of a plurality image components corresponding to the first frame of video from the storage structure, the first subset selected based at least on the first display resolution, the first subset including a base image component corresponding to the first frame of video; and retrieve a second subset of a plurality of image components corresponding to a second of said plurality of frames of video from the storage structure, the second subset selected based at least on the second display resolution, the second subset including a base image component corresponding to the second frame of video.

9. The system of claim 8, wherein the retrieval of at least one of (i) the first subset of the plurality of image components associated with the first frame of video, and/or (ii) the second subset of the plurality of image components associated with the second frame of video, comprises retrieval of image components associated with that frame of video which are associated with a resolution equal to or less than the respective selected first or second display resolution.

10. The system of claim 8, wherein the system is further configured to store the plurality of image components corresponding to at least one of the first frame of video and second frame of video in the storage structure such that the stored plurality of image components are retrievable by the system in order of increasing display resolution.

11. The system of claim 10, wherein the system is further configured such that retrieval of at least one of the first subset of image components and the second subset of image components comprises:

identification of an image component associated with the respective first or second selected display resolution; and consecutive retrieval from the storage structure of the plurality of image components corresponding to the first or second frame of video, respectively, the consecutive retrieval comprising (i) retrieval of the a base image corresponding to the first or second frame of video, respectively, and (ii) retrieval of all other of the plurality of image components up to and including the identified image component.

12. The system of claim 8, wherein the system is further configured to generate an image component index within the storage structure, the component index configured to store locations of the plurality of image components associated with the first and second frames of video in the storage structure, and wherein the retrieval of the first and second subsets of image components each comprises:

identification of one or more of the plurality of image components having associated resolutions equal to or less than the selected display resolution;

identification of one or more locations in the storage structure of the identified one or more image components, the identification of the one or more locations using at least the image component index; and retrieval of the identified one or more image components from the identified one or more locations in the storage structure.

13. The system of claim 8, wherein the selected first display resolution comprises the original resolution, and the retrieved first subset of image components comprises all of the image components corresponding to the first frame of video.

14. The system of claim 13, wherein the selected second display resolution comprises the a resolution less than the original resolution, and the retrieved second subset of image components comprises less than all of the image components corresponding to the second frame of video.

15. A non-transitory computer-readable storage medium storing executable computer program instructions thereon, the program instructions configured for processing video data and that, when executed by a computerized device, cause the computerized device to perform operations comprising:

storage, in a storage structure, for a first of a plurality of frames of video comprising a corresponding image at an original resolution, a corresponding first plurality of image components representative of the first frame of video, the first plurality of image components including: (i) a base image component associated with a base resolution, and (ii) one or more additional image components associated with resolutions greater than the base resolution and less than or equal to the original resolution;

storage, in the storage structure, for a second of the plurality of frames of video comprising a corresponding image at an original resolution, a corresponding second plurality of image components representative of the second frame of video, the second plurality of image components including: (i) a base image component associated with a base resolution, and (ii) one or more additional image components associated with resolutions greater than the base resolution and less than or equal to the original resolution;

select a first display resolution at which to display the first frame of video, the selection based at least on a first processing load;

retrieve a subset of the first plurality of image components from the storage structure, the subset of the first plurality of image components being selected based at least on the first display resolution, the subset of the first plurality of image components including the base image component corresponding to the first frame of video;

decode the retrieved subset of the first plurality of image components to generate a first modified frame of video comprising the image corresponding to the first frame of video represented at the first display resolution;

based at least on a change in the processing load to a second processing load, select a second display resolution at which to display a second frame of video;

retrieve a subset of the second plurality of image components corresponding to the second frame of video from the storage structure, the subset of the second plurality of image components being selected based at least on the second display resolution, the subset of the second plurality of image components including the base image component corresponding to the second frame of video; and decode the retrieved subset of the second plurality of image components to generate a second modified frame of video comprising the image corresponding to the second frame of video represented at the second display resolution.

16. The non-transitory computer-readable storage medium of claim 15, wherein the retrieval of the subset of the first plurality of image components comprises retrieval of image components from the storage structure which are associated with a resolution equal to or less than the selected first display resolution.

17. The non-transitory computer-readable storage medium of claim 15, wherein the first plurality of image components and the second plurality of image components are each stored in the storage structure consecutively from an image component corresponding to the base resolution to an image component corresponding to the original resolution.

18. The non-transitory computer-readable storage medium of claim 17, wherein the retrieval of the subsets of the first and second pluralities of image components comprises:
identification of an image component associated with the respective selected first or second display resolution; and
retrieval of at least a portion of the respective first or second plurality of image components from the storage structure, the retrieval of the at least portion comprising consecutive retrieval beginning with the respective base image component and ending with the identified image component.

19. The non-transitory computer-readable storage medium of claim 15, wherein the plurality of program instructions are further configured to, when executed:
create an image component index associated with the storage structure, the index configured to store respective locations of the first and second pluralities of image components within the storage structure; and
wherein said retrieval of the subsets of the first and second pluralities of the image components comprises:
identification of one or more image components within the first or second pluralities with associated resolutions equal to or less than the selected first or second display resolutions, respectively;
identification of locations of the one or more identified image components in the storage structure using at least the image component index; and
retrieval of the one or more identified image components from the identified locations in the storage structure.

20. A non-transitory computer-readable storage medium storing executable computer program instructions thereon, the program instructions configured for processing video data and that, when executed by a first computerized device, cause the first computerized device to perform operations on a plurality of frames of video data, the plurality of frames each comprising a corresponding original resolution, the operations comprising:
selection of a first display resolution at which to display a first of said plurality of frames of video data, the selection based at least on a first processing load of the first computerized device;
retrieval of a subset of a plurality of image components associated with a first frame of the video data from a storage apparatus in data communication with the first computerized device, the subset selected based at least on the first display resolution, the subset of the first plurality of image components including at least a base image component corresponding to the first frame;
decode of the retrieved subset to generate a first modified frame of video data comprising the image corresponding to the first frame, the image represented at the first display resolution;
detection of at least a change of processing load of the first computerized device from the first processing load to a second processing load;
selection of a second display resolution at which to display a second frame of video, the selection of the second frame of video based at least on the second processing load;
retrieval of a subset of a plurality of image components associated with the second frame of the video data from the storage apparatus, the subset of the plurality of image components associated with the second frame of the video data selected based at least on the second display resolution, the subset of the second plurality of image components including at least a base image component corresponding to the second frame; and
decode of the retrieved subset of the plurality of image components associated with the second frame of the video data to generate a second modified frame of video data comprising the image corresponding to the second frame, the image represented at the second display resolution;
wherein the pluralities of image components representative of the respective first and second frames of video data each include: (i) a base image component associated with a prescribed resolution of the respective first or second frame, and (ii) one or more additional image components associated with resolutions greater than the prescribed resolution and less than or equal to the original resolution of the respective first or second frame.

21. The non-transitory computer-readable storage medium of claim 20, wherein the retrieval of the subset of the first plurality of image components comprises retrieval of image components from the storage structure which are associated with a resolution equal to or less than the selected first display resolution.

22. The non-transitory computer-readable storage medium of claim 20, wherein the first plurality of image components and the second plurality of image components are each stored in the storage structure consecutively from an image component corresponding to the prescribed resolution to an image component corresponding to the original resolution.

23. The non-transitory computer-readable storage medium of claim 22, wherein the retrieval of the subsets of the first and second pluralities of image components comprises:

identification of an image component associated with the respective selected first or second display resolution; and retrieval of at least a portion of the respective first or second plurality of image components from the storage structure, the retrieval of the at least portion comprising consecutive retrieval beginning with the respective base image component and ending with the identified image component.

24. The non-transitory computer-readable storage medium of claim 20, wherein the prescribed resolution comprises a lowest resolution.

25. The non-transitory computer-readable storage medium of claim 20, wherein the plurality of program instructions are further configured to, when executed;

create an image component index associated with the storage structure, the index configured to store respective locations of the first and second pluralities of image components within the storage structure; and wherein said retrieval of the subsets of the first and second pluralities of the image components comprises:

identification of one or more image components within the first or second pluralities with associated resolutions equal to or less than the selected first or second display resolutions, respectively;

identification of locations of the one or more identified image components in the storage structure using at least the image component index; and retrieval of the one or more identified image components from the identified locations in the storage structure.

26. The non-transitory computer-readable storage medium of claim 20, wherein the (i) base image component, and the (ii) one or more additional image components associated with resolutions greater than the prescribed resolution and less than or equal to the original resolution of the respective first or second frame, are each generated by a second computerized device.

27. The non-transitory computer-readable storage medium of claim 26, wherein the first computerized device comprises an encoder apparatus, and the second computerized device comprises a decoder apparatus.

28. The non-transitory computer-readable storage medium of claim 27, wherein the encoder apparatus is at least part of a video camera apparatus, and the decoder apparatus comprises a commoditized personal computer.

29. The non-transitory computer-readable storage medium of claim 20, wherein the (i) base image component, and the (ii) one or more additional image components associated with resolutions greater than the prescribed resolution and less than or equal to the original resolution of the respective first or second frame, are each generated by the first computerized device as part of an encoding process which precedes at least said retrieval of a subset of a plurality of image components associated with a first frame of the video data.

* * * * *

UNITED STATES PATENT AND TRADEMARK OFFICE
CERTIFICATE OF CORRECTION

PATENT NO. : 9,961,355 B2  
APPLICATION NO. : 15/288836  
DATED : May 1, 2018  
INVENTOR(S) : David A. Newman et al.

Page 1 of 1

It is certified that error appears in the above-identified patent and that said Letters Patent is hereby corrected as shown below:

Currently reads ((74) Attorney, Agent, or Firm):  
"(74) Attorney, Agent, or Firm – Gazdzinksi & Associates, PC"

Should read:  
-- (74) Attorney, Agent, or Firm – Gazdzinski & Associates, PC --

Signed and Sealed this  
Eleventh Day of December, 2018

Andrei Iancu  
*Director of the United States Patent and Trademark Office*